(12) United States Patent
Chen et al.

(10) Patent No.: US 11,611,453 B2
(45) Date of Patent: Mar. 21, 2023

(54) NETWORK INTERFACE PROVISIONING OF CONTAINERIZED INSTANCES BASED ON TENANT POLICIES

(71) Applicant: Red Hat, Inc., Raleigh, NC (US)

(72) Inventors: Huamin Chen, Westford, MA (US); Douglas K. Smith, Montpelier, VT (US)

(73) Assignee: Red Hat, Inc., Raleigh, NC (US)

( * ) Notice: Subject to any disclaimer, the term of this patent is extended or adjusted under 35 U.S.C. 154(b) by 11 days.

(21) Appl. No.: 17/185,406

(22) Filed: Feb. 25, 2021

(65) Prior Publication Data
US 2022/0271975 A1 Aug. 25, 2022

(51) Int. Cl.
*H04L 12/46* (2006.01)
*G06F 9/455* (2018.01)
*H04L 41/50* (2022.01)

(52) U.S. Cl.
CPC ...... *H04L 12/4679* (2013.01); *G06F 9/45558* (2013.01); *H04L 41/5096* (2013.01); *G06F 2009/45562* (2013.01); *G06F 2009/45595* (2013.01)

(58) Field of Classification Search
CPC ............. H04L 12/4679; H04L 41/5096; G06F 9/45558; G06F 2009/45562; G06F 2009/45595
See application file for complete search history.

(56) References Cited

U.S. PATENT DOCUMENTS

| | | | | |
|---|---|---|---|---|
| 11,070,471 | B1 * | 7/2021 | Chang | .................... H04L 45/66 |
| 11,316,822 | B1 * | 4/2022 | Gawade | .............. G06F 11/2025 |
| 2015/0358290 | A1 * | 12/2015 | Jain | ..................... H04L 63/0254 726/13 |
| 2018/0121110 | A1 * | 5/2018 | Sawhney | ............... G06F 3/0685 |
| 2020/0295988 | A1 | 9/2020 | Bolding et al. | |
| 2022/0052904 | A1 * | 2/2022 | Howard | .................. H04L 47/41 |
| 2022/0164197 | A1 * | 5/2022 | Fichtenholtz | ....... G06F 9/44505 |
| 2022/0232098 | A1 * | 7/2022 | DeArment | .............. H04L 67/60 |

OTHER PUBLICATIONS

UGwuanyl et al., "Network Virtualization: Proof of Concept for Remote Management of Mulit-Tenant Infrastructure", 2020 IEEE 6th international Conference on Dependability in Sensor, Cloud, and Big Data Systems and Application, Dec. 14, 2020.*

(Continued)

*Primary Examiner* — Todd L Barker
(74) *Attorney, Agent, or Firm* — Dority & Manning, P.A.

(57) ABSTRACT

Network interface provisioning of containerized instances based on tenant policies. A network interface assignment process (NIAP) receives a first request to assign a network interface to a first containerized instance comprising at least one container. The NIAP determines that a first tenant of a plurality of different tenants is associated with the first containerized instance. The NIAP accesses a first network assignment tenant policy (NATP) that corresponds to the first tenant. Based on the first NATP, the NIAP assigns, to the first containerized instance, a first network interface via which the first containerized instance can communicate with other containerized instances associated with the first tenant.

20 Claims, 15 Drawing Sheets

(56) References Cited

OTHER PUBLICATIONS

Jin et al., "Role and attribute based collaborative admininstration of intra-tenant cloud IaaS", 10th IEEE International Conference on Collaborative Computing: Networking, Applications and Worksharing, Oct. 2014.*

Sarkale et al., "Secure Cloud Container:Runtime Behavior Montioring Using Most Privileged Container (MPC)", IEEE 4th International Conference on Cyber Security and Cloud Computing, Jun. 2017.*

Kappes et al., "Multitenant Access Control for Cloud-Aware Distributed Filesystems", IEEE Transactions on Dependendable and Secure Computing, vol. 16, Issue 6, Nov. 2019.*

Kale, Levente, et al., "DANM User guide," https://github.com/nokia/danm/blob/master/user-guide.md, accessed Nov. 9, 2020, 22 pages.

Patel, Hiral, et al., "Application Network Acceleration on OpenShift with Diamanti CNI," https://diamanti.com/application-network-acceleration-on-openshift-with-diamanti-cni/, Nov. 3, 2020, 4 pages.

* cited by examiner

NETWORK INTERFACE PROVISIONING OF CONTAINERIZED INSTANCES BASED ON TENANT POLICIES

BACKGROUND

Data processing systems are increasingly implemented using containerization technologies due to the relatively low resource utilization of containers, due to the availability of robust container orchestration systems, and for a multitude of other reasons. Often a containerized application may be implemented in a multi-tenant environment where multiple computing devices are used to host containers associated with a number of different tenants.

SUMMARY

The examples disclosed herein implement network interface provisioning of containerized instances based on tenant policies.

In one example a method is provided. The method includes receiving, by a first network interface assignment process (NIAP) executing on a first processor device on a first computing device, a first request to assign a network interface to a first containerized instance comprising at least one container. The method further includes determining, by the first NIAP, that a first tenant of a plurality of different tenants is associated with the first containerized instance. The method further includes accessing, by the first NIAP, a first network assignment tenant policy (NATP) that corresponds to the first tenant. The method further includes, based on the first NATP, assigning, to the first containerized instance, a first network interface via which the first containerized instance can communicate with other containerized instances associated with the first tenant.

In another example a computing device is provided. The computing device includes a memory, and a processor device coupled to the memory to receive, by a first network interface assignment process (NIAP), a first request to assign a network interface to a first containerized instance comprising at least one container. The processor device is further to determine, by the first NIAP, that a first tenant of a plurality of different tenants is associated with the first containerized instance. The processor device is further to access, by the first NIAP, a first network assignment tenant policy (NATP) that corresponds to the first tenant. The processor device is further to, based on the first NATP, assign, to the first containerized instance, a first network interface via which the first containerized instance can communicate with other containerized instances associated with the first tenant.

In another example a non-transitory computer-readable storage medium is provided. The non-transitory computer-readable storage medium includes executable instructions to cause a processor device to receive, by a first network interface assignment process (NIAP), a first request to assign a network interface to a first containerized instance comprising at least one container. The executable instructions further cause the processor device to determine, by the first NIAP, that a first tenant of a plurality of different tenants is associated with the first containerized instance. The executable instructions further cause the processor device to access, by the first NIAP, a first network assignment tenant policy (NATP) that corresponds to the first tenant. The executable instructions further cause the processor device to, based on the first NATP, assign, to the first containerized instance, a first network interface via which the first containerized instance can communicate with other containerized instances associated with the first tenant.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
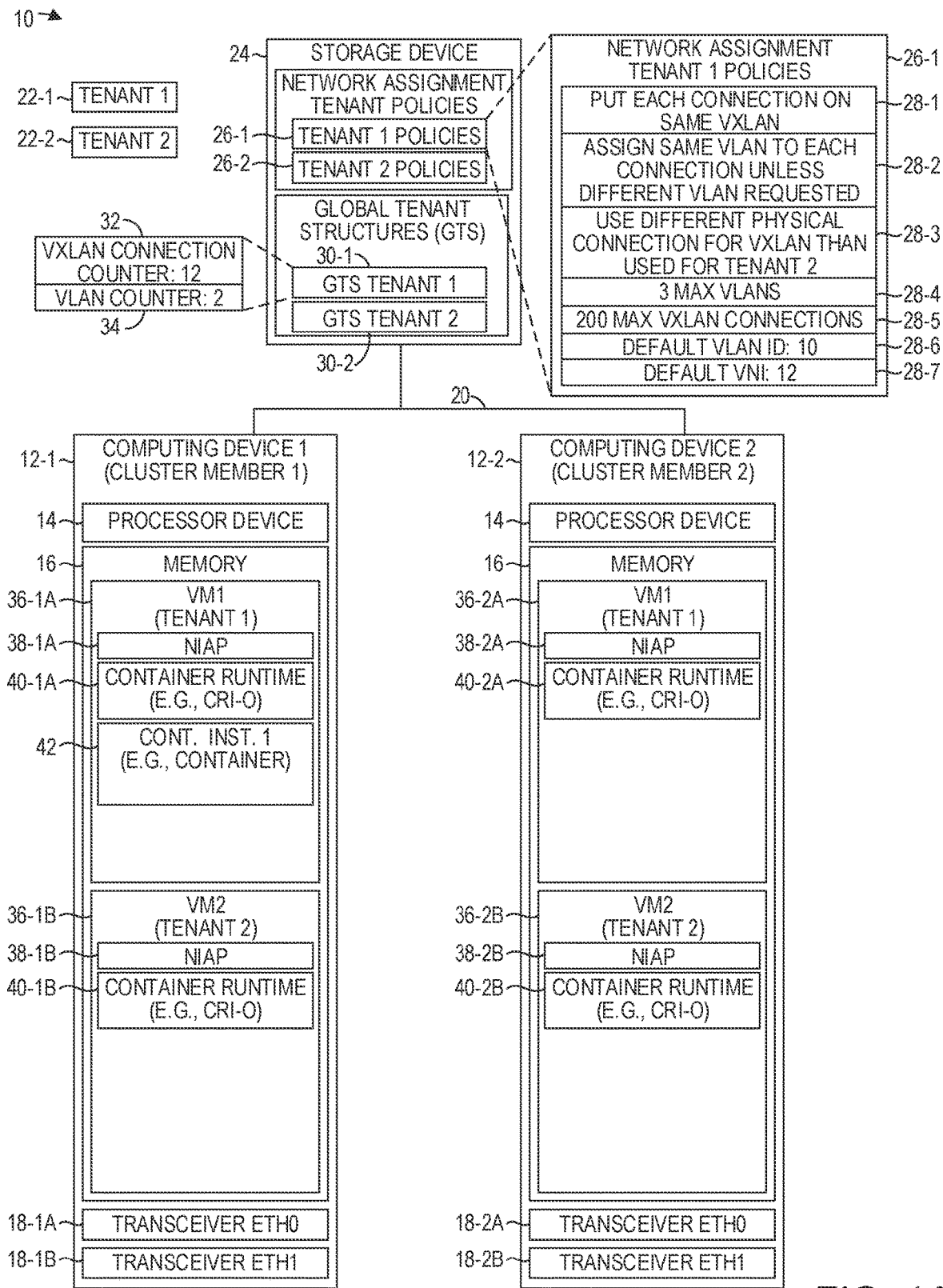
FIGS. 1A-1C are block diagrams of an environment at different points in time in which examples can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Data processing systems are increasingly implemented using containerization technologies due to the relatively low resource utilization of containers, due to the availability of robust container orchestration systems, and for a multitude of other reasons. Often a containerized application may be implemented in a multi-tenant environment where multiple computing devices are used to host containers associated with a number of different tenants.

A containerized instance executes in an isolated environment, such as, in a Linux context, a namespace, that inhibits the containerized instance from accessing memory or files of another containerized instance. In order for a containerized instance to be able to communicate outside of this isolated environment, the containerized instance may be provisioned with a network interface. A large software system may involve hundreds or even thousands of containerized instances and may be executing in an environment, such as a cloud computing environment, that is concurrently hosting large software systems of a large number of tenants.

In some situations, it is desirable to implement a virtualized overlay network on top of a physical network interface to simplify the inter-containerized instance communications and/or for security purposes. Sometimes network overlay technologies, such as Virtual Extensible Local Area Network (VXLAN) and Virtual Local Area Network (VLAN), are used for these purposes. It can be extremely difficult to ensure that containerized instances associated with a same tenant are correctly provisioned with VXLAN network identifiers (VNIs) or VLAN identifiers (IDs) on hundreds of different computing devices, especially when containerized instances can be automatically shut down on one computing device and restarted on another computing device.

The examples disclosed herein implement network interface provisioning of containerized instances based on tenant policies. The examples include a network interface assignment process (NIAP) that receives a request to assign a network interface to a containerized instance that is initiating. The NIAP accesses a network assignment tenant policy (NATP) that corresponds to a tenant that is associated with the containerized instance, and, based on the NATP, assigns the containerized instance, a network interface via which the containerized instance can communicate with other containerized instances associated with the first tenant.

Among other advantages, the examples ensure consistency in network interfaces assigned to containerized instances across a plurality of different computing devices, eliminate problems associated with incorrect network interface parameters contained in templates or configuration files that may otherwise prevent a containerized instance from successfully being assigned a network interface, and ensure different tenants are not inadvertently being assigned the same VNIs or VLAN IDs.

FIG. 1A is a block diagram on an environment 10 in which examples can be practiced. The environment 10 includes computing devices 12-1 and 12-2 (generally, computing devices 12) which implement a cluster of computing devices that is configured to initiate containerized instances as needed. In some implementations, the environment 10 may be a cloud computing environment implemented by a cloud computing environment provider, such as Amazon® AWS™, Microsoft® Azure®, or the like. While for purposes of illustration only two computing devices 12 are illustrated, the two computing devices 12 may be two of hundreds or thousands of computing devices 12 in the environment 10. The environment 10 is a multiple-tenant environment, and containerized instances from different tenants may be executing on the same computing device 12. The term "tenant" as used herein refers to different entities whose associated containers and data are to be isolated from one another. By way of non-limiting example, tenants may be different corporate entities, or different departments within the same corporate entity, or may be defined by any other desired criteria. For a public cloud computing environment provider, tenants may be defined as different service accounts. In some implementations, tenants may be defined as different namespaces.

The term "containerized instance" as used herein refers to an entity that includes a container that is initiated from a container image. The phrase "container" as used herein refers to Linux containers wherein the Linux kernel uses namespaces to isolate processes from one another. The phrase "container image" as used herein refers to a static package of software comprising one or more layers, the layers including everything needed to run an application (i.e., as a container) that corresponds to the container image, including, for example, one or more of executable runtime code, system tools, system libraries and configuration settings. A Docker® image is an example of a container image.

Figure 1B:
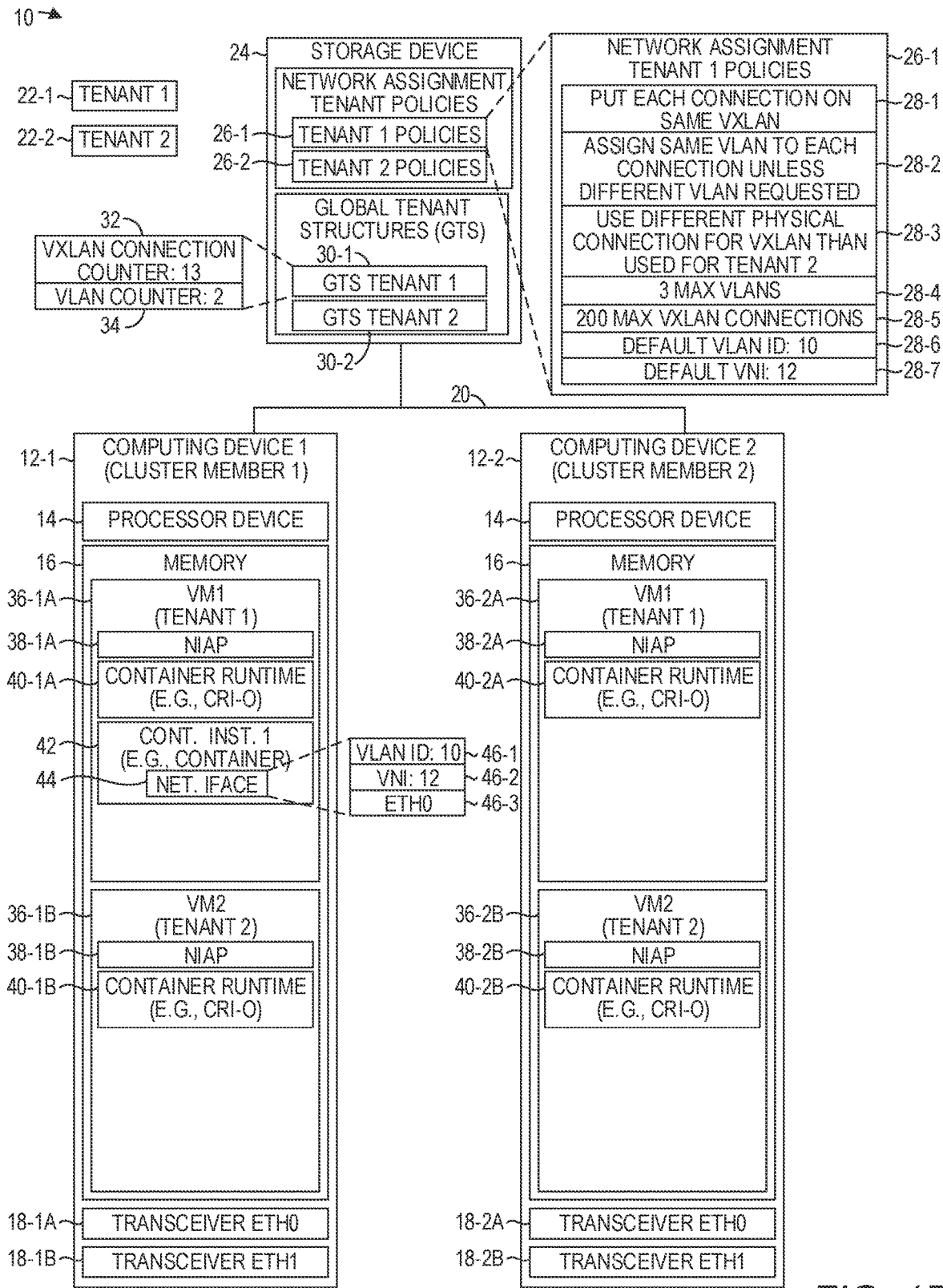
Figure 1C:
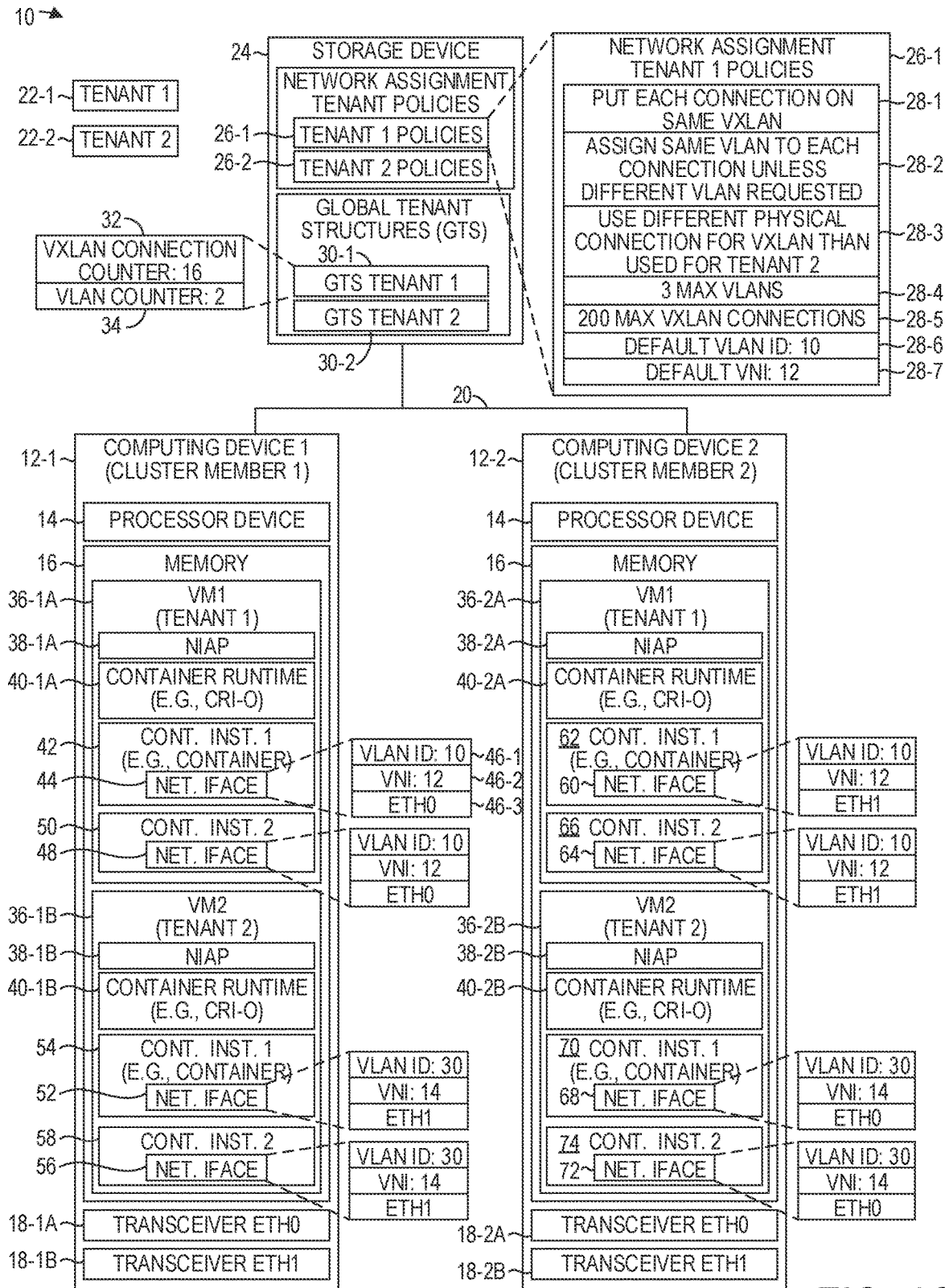

A "containerized instance" may comprise only a container, or may comprise, for example, a logical grouping of containers in the same namespace such as a Kubernetes pod. A pod is a logical entity that can isolate one or more containers in a pod from one or more containers in another pod. A pod is defined via a pod specification which includes information such as an identification of the containers in the pod, the volumes used by the containers in the pod, and the like. In the example of FIGS. 1A-1C, containerized instances are containers. Each container is a separate containerized instance from each other container.

The computing devices 12 include processor devices 14 and memories 16. The computing device 12-1 includes two physical network interfaces 18-1A and 18-1B, each of which has a unique media access control (MAC) address. The physical network interfaces 18-1A and 18-1B are directly connected to different ports of the same switch or different switches (not illustrated). Similarly, the computing device 12-2 includes two physical network interfaces 18-2A and 18-2B, each of which has a unique media access control (MAC) address. The physical network interfaces 18-2A and 18-2B are directly connected to different ports of the same switch or different switches (not illustrated). The computing devices 12-1 and 12-2 can communicate with one another via one or more networks 20. The computing devices 12-1 and 12-2 may be in close proximity to one another or may be located a substantial distance from one another, such as thousands of miles from one another.

In this example, the environment 10 initiates containerized instances associated with two different tenants 22-1 ("Tenant 1") and 22-2 ("Tenant 2"). As discussed above, tenancy is a categorization based on some criterion, such as different service accounts, different departments, different namespaces, or the like. While for purposes of illustration only two tenants 22 are illustrated, in practice the environment 10 may initiate containerized instances associated with hundreds or thousands of different tenants.

The computing devices 12 are communicatively coupled to a storage device 24. The storage device 24 maintains information associated with the tenants 22. In particular, the storage device 24 maintains a network assignment tenant policy (NATP) 26-1 and a NATP 26-2 (generally, NATPs 26) that correspond to the tenants 22-1, 22-2, respectively. Each NATP 26 governs the assignment of network interfaces to containerized instances that are associated with the respective tenant 22.

As an example, the NATP 26 includes a policy 28-1 that indicates that each network interface assigned to a containerized instance associated with the tenant 22-1 should be given the same VNI. A policy 28-2 indicates that the same VLAN ID should be assigned to each containerized instance associated with the tenant 22-1 unless the network assignment request for a particular containerized instance specifically requests a particular VLAN ID. A policy 28-3 indicates that the network interfaces assigned to containerized instances associated with the tenant 22-1 should be associated with different physical network interfaces (e.g., physical network interfaces 18-1A, 18-1B, 18-2A, 18-2B) than the network interfaces assigned to containerized instances associated with the tenant 22-2.

A policy 28-4 indicates that a maximum of three VLANs may be established for the containerized instances associated with the tenant 22-1. A policy 28-5 indicates that there is a maximum of 200 VXLAN connections that can be established for containerized instances associated with the tenant 22-1. A policy 28-6 indicates that a default VLAN ID is "10". A policy 28-7 indicates that a default VNI is "12". It is noted that these are merely examples of policies that may govern the assignment of network interfaces to containerized instances, and that any definable policy may be used. The NATP 26-2 similarly identifies NATPs for assigning network interfaces to containerized instances associated with the tenant 22-2.

The storage device 24 also maintains a global tenant structure (GTS) 30-1 and a GTS 30-2 (generally, GTSs 30) that correspond to the tenants 22-1, 22-2, respectively. Each GTS 30 maintains one or more counters associated with the corresponding NATPs 26. For example, the GTS 30-1 maintains a counter 32 that is updated to keep track of the number of VXLAN network interfaces that have been assigned to containerized instances associated with the tenant 22-1, and a counter 34 that is updated to keep track of the number of VLAN IDs that have been assigned to containerized instances associated with the tenant 22-1.

The environment 10 initiates, upon request or in response to some criterion, such as load or demand, virtual machines (VMs) on the computing devices 12. A VM typically runs a guest operating system in conjunction with a virtual machine monitor (not illustrated), such as a hypervisor, that is configured to coordinate access to physical resources of a physical machine, such as a memory and a processor device, by the virtual machines running on the physical machine.

The VMs may be associated with a particular tenant 22, and VMs for different tenants 22 may be initiated on the same computing devices 12. For example, the computing device 12-1 includes a VM 36-1A that is associated with the tenant 22-1 and a VM 36-1B that is associated with the tenant 22-2. The computing device 12-2 includes a VM 36-2A that is associated with the tenant 22-1 and a VM 36-2B that is associated with the tenant 22-2. The VMs 36-1A, 36-1B, 36-2A, and 36-2B may be referred to as the VMs 36, generally.

As part of initializing the VM 36-1A, a network interface assignment process (NIAP) 38-1A was initialized. The NIAP 38-1A is process that, upon request, assigns a network interface to a containerized instance. It is noted that, because the NIAP 38-1A is a component of the computing device 12-1, functionality implemented by the NIAP 38-1A may be attributed to the computing device 12-1 generally. Moreover, in examples where the NIAP 38-1A comprises software instructions that program the processor device 14 to carry out functionality discussed herein, functionality implemented by the NIAP 38-1A may be attributed herein to the processor device 14. Similarly, NIAPs 38-1B, 38-2A, and 38-2B are initiated by the VMs 36-1B, 36-2A, and 36-2B, respectively.

Each VM 36-1A, 36-1B, 36-2A, and 36-2B includes a corresponding container runtime 40-1A, 40-1B, 40-2A, and 40-2B (generally, container runtimes 40), respectively. The container runtimes 40 manage and control the initialization of containers in containerized instances. Any container runtime 40 may be utilized, such as, by way of non-limiting example, a Linux container runtime, a CRI-O container runtime, or the like.

With this background of various components of the environment 10, an example of network interface provisioning of a containerized instance based on tenant policies will now be discussed. Assume for purposes of illustration that the VM 36-1A (or a process executing therein, including the container runtime 40-1A) determines that a containerized instance 42 for the tenant 22-1 is to be initiated. Either immediately prior to the initialization or during the initialization of the containerized instance 42, the NIAP 38-1A is called, invoked, or otherwise requested to assign a network interface to the containerized instance 42. The NIAP 38-1A may be requested by the container runtime 40-1A or some other process in the VM 36-1A that operates in conjunction with the container runtime 40-1A to initiate containerized instances in the VM 36-1A.

The NIAP 38-1A accesses information to identify or otherwise determine the tenant 22 with which the containerized instance 42 is associated. The information via which the NIAP 38-1A determines the appropriate tenant 22 may be provided to the NIAP 38-1A in conjunction with the request. In this example, the NIAP 38-1A determines that the containerized instance 42 is associated with the tenant 22-1.

The NIAP 38-1A accesses the NATP 26-1, which corresponds to the tenant 22-1, and which identifies policies that are to be used in the assignment of network interfaces to containerized instances associated with the tenant 22-1. The NIAP 38-1A also accesses the GTS 30-1 to determine whether the assignment of a network interface to the containerized instance 42 would violate any of the policies, such as exceeding a VXLAN connection count, or the number of VLAN IDs associated with the tenant 22-1. In this example, the NIAP 38-1A determines that assignment of a network interface to the containerized instance 42 would not violate any of the policies.

Referring now to FIG. 1B, the NIAP 38-1A, based on the NATP 26-1, assigns a network interface 44 to the containerized instance 42. The general process involved for generating and assigning the network interface 44 may differ depending on the underlying operating system or environment. In some implementations, the process involves the use of a virtual bridge, such as a Linux bridge, and the assignment of an interface to the Linux bridge that is bound to a particular physical network interface 18-1A or 18-1B. In this example, the network interface 44 has a VLAN ID attribute 46-1 that indicates the network interface 44 has been assigned the default VLAN ID contained in the policy 28-6 of the NATP 26-1, a VNI attribute 46-2 that indicates the network interface 44 has been assigned the default VNI contained in the policy 28-7 of the NATP 26-1, and a physical interface attribute 46-3 that indicates the network interface is assigned to the physical network interface 18-1A ("ETH0").

The NIAP 38-1A returns this information to the process that made the request of the NIAP 38-1A, such as the container runtime 40-1A or other process. The NIAP 38-1A also updates the counter 32 to reflect the assignment of the network interface 44 by incrementing the counter 32 by a value of 1 to maintain a real-time count of the number of VXLAN network interfaces assigned to containerized instances of the tenant 22-1.

Referring now to FIG. 1C, the NIAP 38-1A subsequently assigns a network interface 48 to a containerized instance 50 based on the NATP 26-1 and updates the counter 32 accordingly. The NIAP 38-1B in the VM 36-1B that is associated with the tenant 22-2 assigns a network interface 52 to a containerized instance 54 based on the NATP 26-2 and updates the GTS 30-2 accordingly. The NIAP 38-1B assigns a network interface 56 to a containerized instance 58 based on the NATP 26-2 and updates the GTS 30-2 accordingly. Note that the NIAP 38-1B assigns the network interfaces 52 and 56 to the physical network interface 18-1B to comply with the policy 28-3 to ensure the network traffic associated with the tenant 22-1 is put on a different physical network interface than the network traffic associated with the tenant 22-2.

On the computing device 12-2, the NIAP 38-2A in the VM 36-2A that is associated with the tenant 22-1 subsequently assigns a network interface 60 to a containerized instance 62 based on the NATP 26-1 and updates the counter 32 accordingly. The NIAP 38-2A also subsequently assigns a network interface 64 to a containerized instance 66 based on the NATP 26-1 and updates the counter 32 accordingly. Note that the NIAP 38-2A updates the same counter 32 as the NIAP 38-1A executing on the computing device 12-1.

The NIAP 38-2B in the VM 36-2B that is associated with the tenant 22-2 subsequently assigns a network interface 68 to a containerized instance 70 based on the NATP 26-2 and updates the GTS 30-2 accordingly. The NIAP 38-2B subsequently assigns a network interface 72 to a containerized instance 74 based on the NATP 26-2 and updates the GTS 30-2 accordingly. Note that the NIAP 38-2B updates the same GTS 30-2 as the NIAP 38-1B executing on the computing device 12-1.

When the containerized instance 42 is terminated, the NIAP 38-1A is invoked. The NIAP 38-1A performs appropriate removal and/or cleanup of network interface structures or data associated with the network interface 44 and updates the counter 32 to maintain the real-time count of VXLAN network connections utilized by containerized instances associated with the tenant 22-1. The NIAPs 38-2A, 38-1B, and 38-2B operate similarly.

Figure 2:
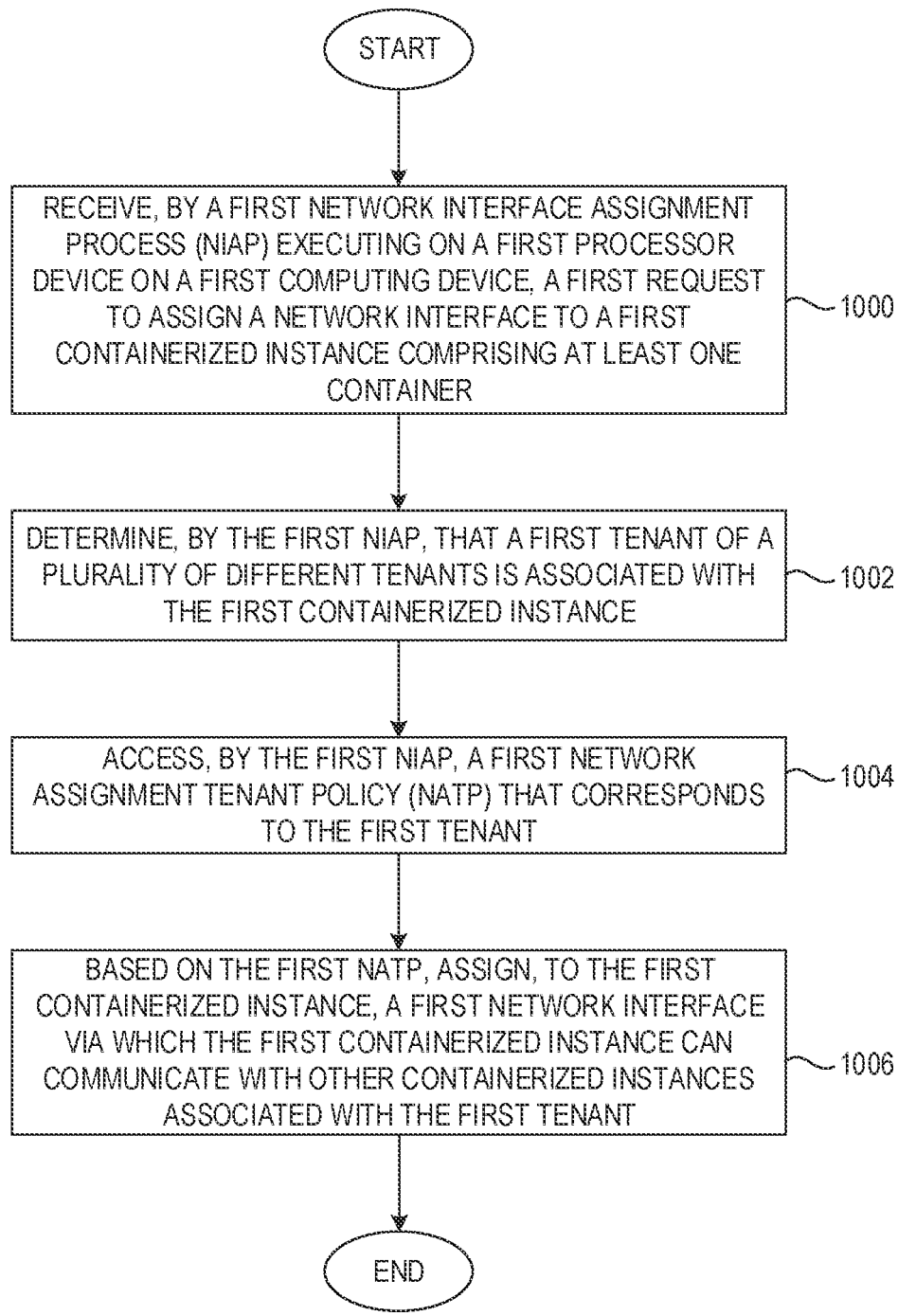
FIG. 2 is a flowchart of a method for network interface provisioning of containerized instances based on tenant policies according to one implementation.

FIG. 2 is a flowchart of a method for network interface provisioning of containerized instances based on tenant policies according to one implementation. FIG. 2 will be discussed in conjunction with FIGS. 1A-1C. The NIAP 38-1A receives a request to assign a network interface to the containerized instance 42 (FIG. 2, block 1000). The NIAP 38-1A determines that the tenant 22-1 of the plurality of different tenants 22 is associated with the containerized instance 42 (FIG. 2, block 1002). The NIAP 38-1A accesses the NATP 26-1 that corresponds to the tenant 22-1 (FIG. 2, block 1004). Based on the NATP 26-1, the NIAP 38-1A assigns to the containerized instance 42 the network interface 44 via which the containerized instance 42 can communicate with other containerized instances associated with the tenant 22-1 (FIG. 2, block 1006).

Figure 3A:
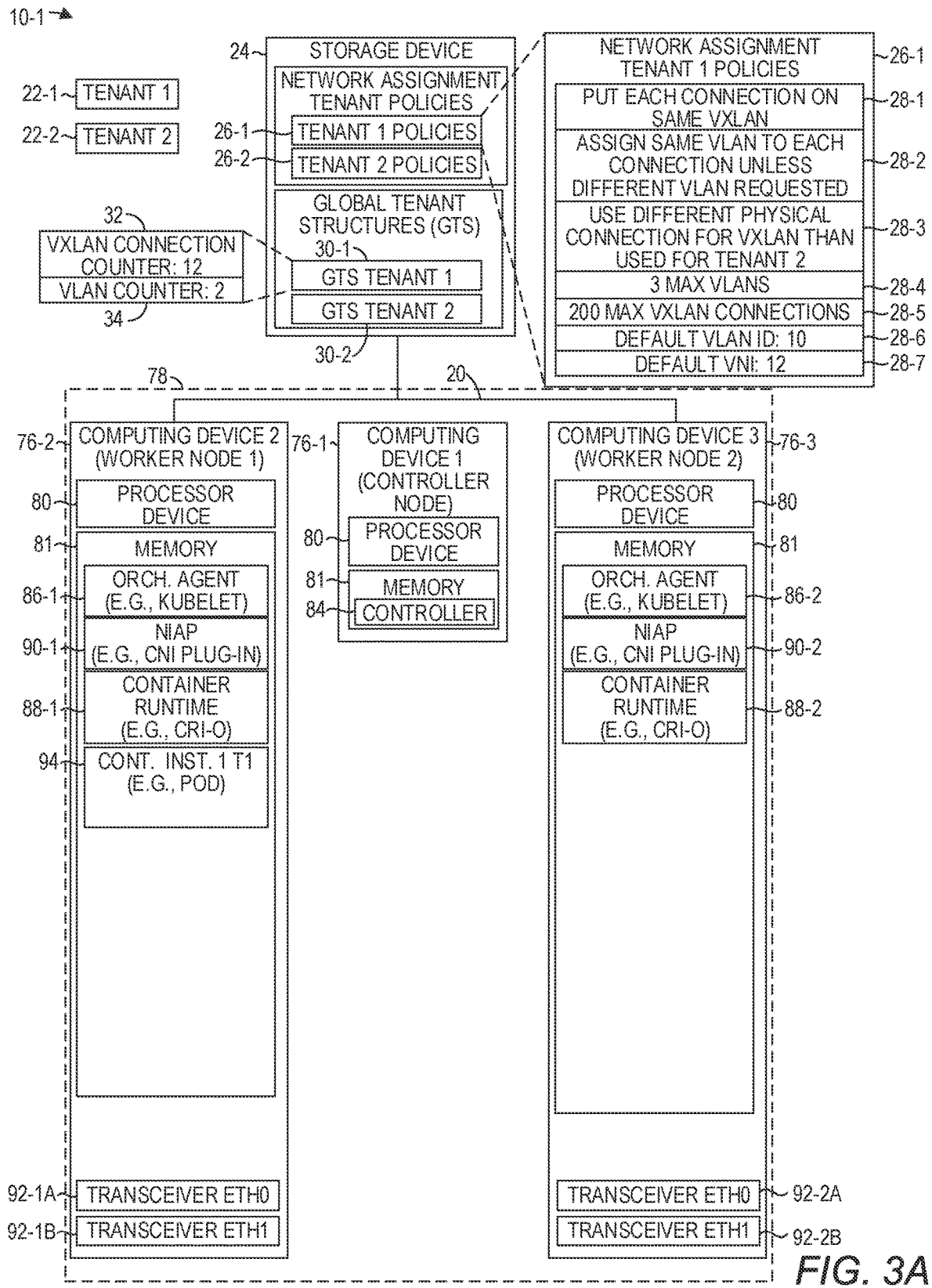
FIGS. 3A-3C are block diagrams of an environment at different points in time in which examples can be practiced according to another implementation.
Figure 3B:
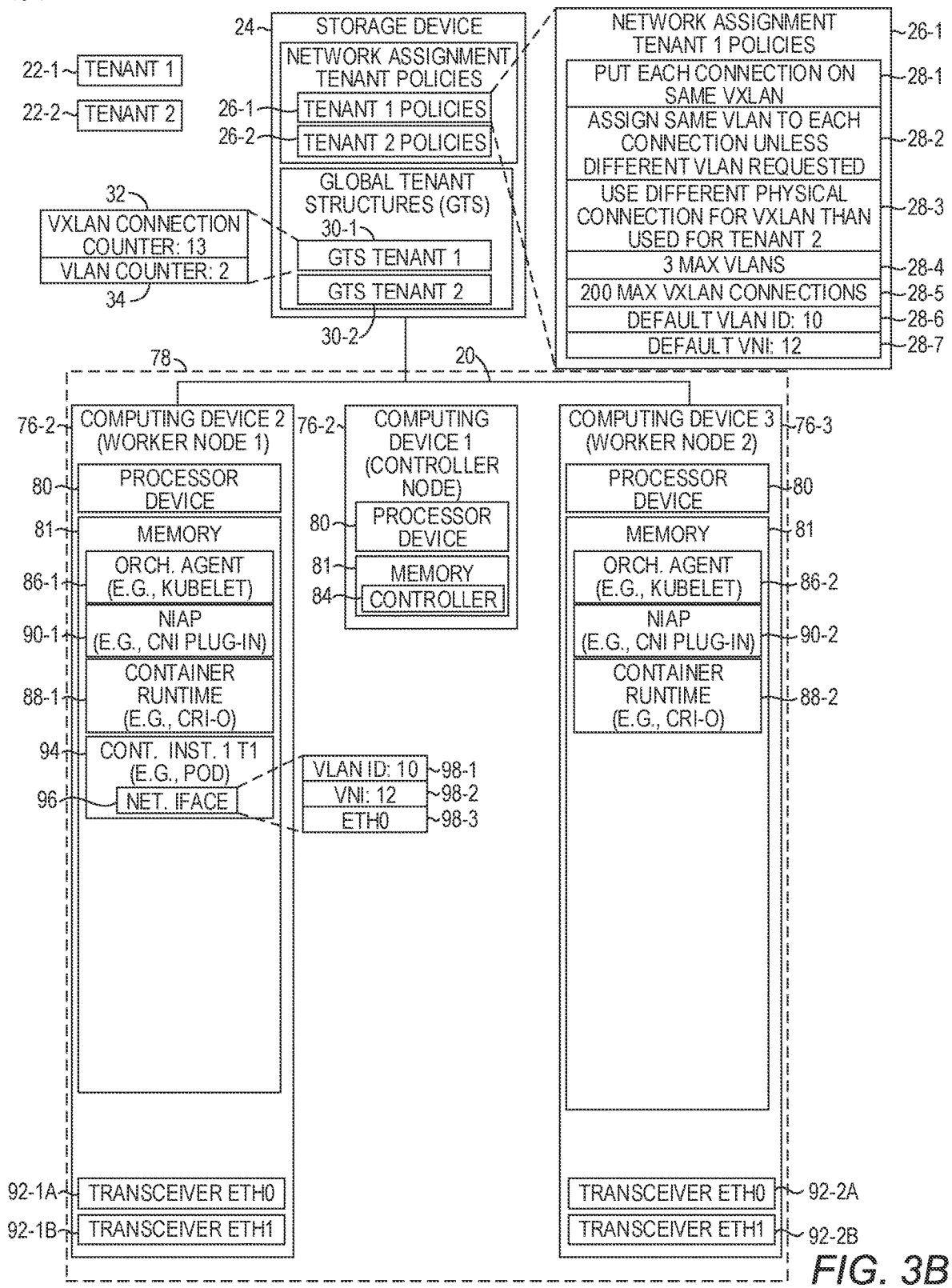
Figure 3C:
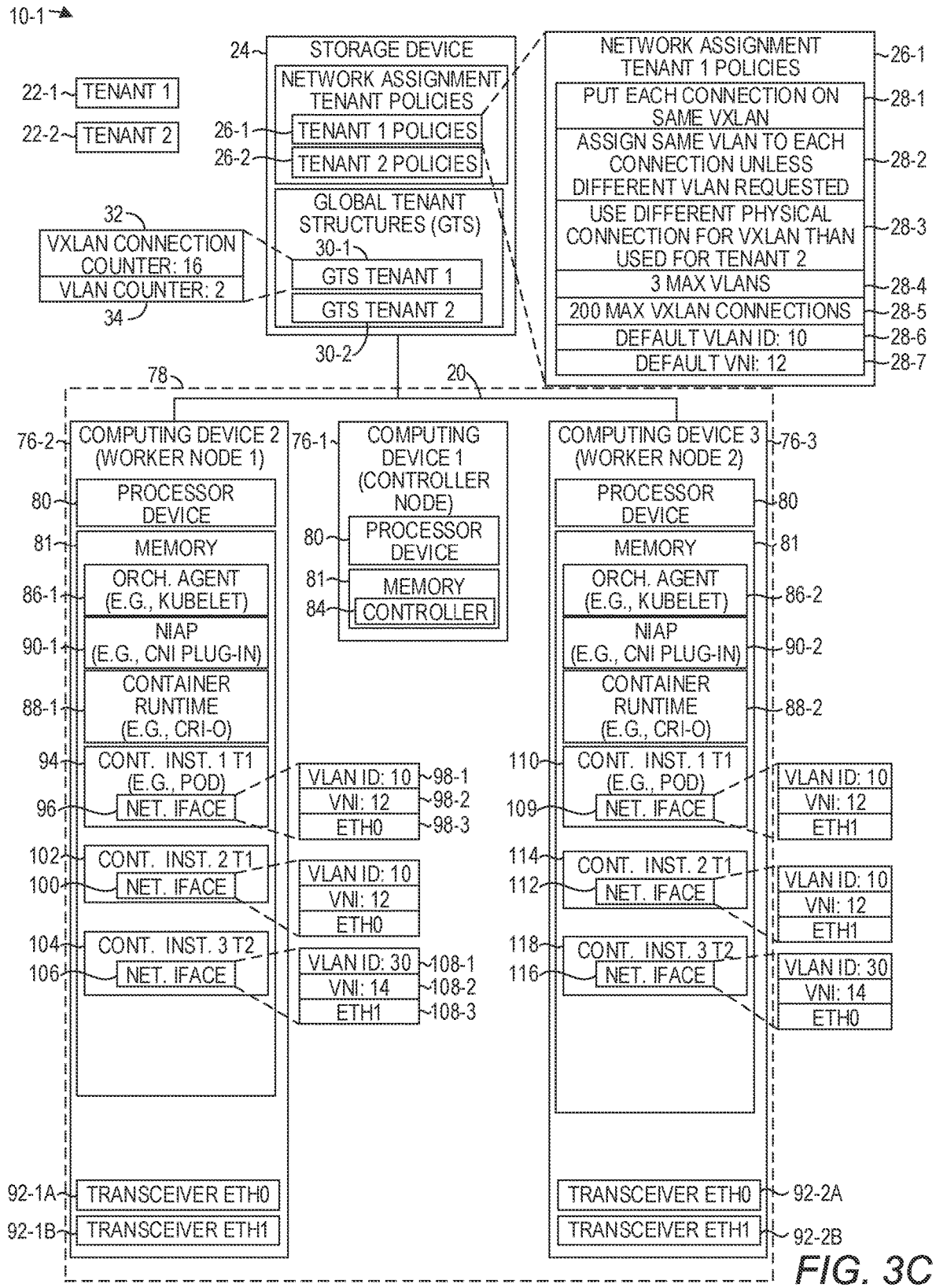

FIGS. 3A-3C are block diagrams of an environment 10-1 according to another implementation. The environment 10-1 initiates containerized instances associated with the two different tenants 22-1 ("Tenant 1") and 22-2 ("Tenant 2"). The environment 10-1 includes the storage device 24 and the NATPs 26-1 and 26-2, as discussed above with regard to FIGS. 1A-1C. The environment 10-1 also includes the GTSs 30-1 and GTS 30-2, also as discussed above with regard to FIGS. 1A-1C.

The environment 10-1 includes a plurality of computing devices 76-1, 76-2, and 76-3 (generally, computing devices 76). A container orchestration system 78 executes on the computing devices 76. Container orchestration systems automate the deployment, scaling, and management of containerized instances among nodes in a cluster. In this example, the container orchestration system 78 includes a controller node that is implemented on the computing device 76-1, and two worker nodes that are implemented on the computing devices 76-2 and 76-3. The computing device 76-1 may be referred to herein as the controller node computing device 76-1 to reflect its role in the container orchestration system 78. In some implementations, the container orchestration system 78 may comprise the Kubernetes container orchestration system, available at Kubernetes.io; however, the examples disclosed herein may be implemented in any container orchestration system, such as, by way of non-limiting example, the Amazon® elastic container service (ECS), the Google® Kubernetes engine, the Azure™ Kubernetes service, the Oracle® cloud infrastructure container engine for Kubernetes, or the like.

The computing devices 76 each have at least one processor device 80 and a memory 81. The controller node computing device 76-1 includes a controller 84 that is responsible for the overall management of the containerized instances initiated on the computing devices 76-2 and 76-3. In a Kubernetes implementation, the controller 84 may include the application programming interface (API) server, etcd, scheduler, and controller manager components of Kubernetes. The computing devices 76-2 and 76-3 include orchestration agents 86-1 and 86-2, respectively, which coordinate with the controller 84 to manage the lifecycle of containerized instances 42 on the computing devices 76-2 and 76-3. In a Kubernetes implementation, the orchestration agents 86-1 and 86-2 may comprise kubelets and kube-proxies of Kubernetes.

The computing devices 76-2 and 76-3 include container runtimes 88-1 and 88-2 (generally, container runtimes 88), respectively. The container runtimes 88 manage and control the initialization of containerized instances on the computing devices 76-2 and 76-3. Any container runtime 88 may be utilized, such as, by way of non-limiting example, a Linux container runtime, a CRI-O container runtime, or the like.

The computing devices 76-2 and 76-3 include NIAPs 90-1 and 90-2 (generally, NIAPs 90) respectively, which serve the same function as the NIAPs 38 discussed above with regard to FIGS. 1A-1C. In this example, however, the NIAPs 90 may comprise container network interface (CNI) plug-ins that are compliant with the container network interface, available at www.github.com/containernetworking/cni.

The computing device 76-2 includes two physical network interfaces 92-1A and 92-1B, each of which has a unique media access control (MAC) address. The physical network interfaces 92-1A and 92-1B are directly connected to different ports of the same switch or different switches (not illustrated). Similarly, the computing device 76-3 includes two physical network interfaces 92-2A and 92-2B, each of which has a unique media access control (MAC) address. The physical network interfaces 92-2A and 92-2B are directly connected to different ports of the same switch or different switches (not illustrated).

With this background of various components of the environment 10-1, an example of network interface provisioning of a containerized instance based on tenant policies will now be discussed. In the container orchestration system 78, a containerized instance comprises a Kubernetes pod. A pod is a logical entity that can isolate one or more containers in a pod from one or more containers in another pod. A pod is defined via a pod specification that includes information such as an identification of the containers in the pod, the volumes used by the containers in the pod, and the like. Each pod typically executes in a namespace. Pods that are to be separated from one another may be executed in different namespaces.

Assume for purposes of illustration that the controller 84 on the controller node computing device 76-1 determines that a containerized instance 94 is to executed on the worker node computing device 76-2. The controller 84 sends information to the orchestration agent 86-1 regarding the containerized instance 94. The information may comprise configuration information, sometimes referred to as a pod specification or pod manifest, that contains information about the containerized instance 94, including the container images of the containers that are to be instantiated and network information.

Either immediately prior to the initialization or during the initialization of the containerized instance 94 the NIAP 90-1 is called, invoked, or otherwise requested to assign a network interface to the containerized instance 94. The request may include parameters received from the controller 84, such as a pod template or manifest. The NIAP 90-1 may receive the request from either the orchestration agent 86-1, or the container runtime 88-1, depending on the particular container runtime 88-1.

The NIAP 90-1 accesses information to identify or otherwise determine the tenant 22 with which the containerized instance 94 is associated. The information via which the NIAP 90-1 determines the appropriate tenant 22 may be provided to the NIAP 90-1 in conjunction with the request. In this example, the NIAP 90-1 determines that the containerized instance 94 is associated with the tenant 22-1.

The NIAP 90-1 accesses the NATP 26-1, which corresponds to the tenant 22-1, and which identifies policies that are to be used in the assignment of network interfaces to containerized instances associated with the tenant 22-1. The NIAP 90-1 also accesses the GTS 30-1 to determine whether the assignment of a network interface to the containerized instance 94 would violate any of the policies, such as exceeding a VXLAN connection count, of the number of VLAN IDs associated with the tenant 22-1. In this example, the NIAP 90-1 determines that assignment of a network interface to the containerized instance 94 would not violate any of the policies.

Referring now to FIG. 3B, the NIAP 90-1, based on the NATP 26-1, assigns a network interface 96 to the containerized instance 94. In this example, the network interface 96 has a VLAN ID attribute 98-1 that indicates the network interface 96 has been assigned the default VLAN ID contained in the policy 28-6 of the NATP 26-1, a VNI attribute 98-2 that indicates the network interface 96 has been assigned the default VNI contained in the policy 28-7 of the NATP 26-1, and a physical interface attribute 98-3 that indicates the network interface is assigned to the physical network interface 92-1A ("ETH0"). In some implementations, the parameters provided to the NIAP 90-1 along with the request may identify a preferred VLAN ID to be assigned to the network interface 96 so that the containerized instance 94 can have secure communications with a subset of other containerized instances that have requested the same VLAN ID.

The NIAP 90-1 returns this information to the process that made the request of the NIAP 90-1, such as the orchestration agent 86-1 or the container runtime 88-1. The NIAP 90-1 also updates the counter 32 to reflect the assignment of the network interface 96 by incrementing the counter 32 by a value of 1 to maintain a real-time count of the number of VXLAN network interfaces assigned to containerized instances of the tenant 22-1.

Referring now to FIG. 3C, the NIAP 90-1 subsequently assigns a network interface 100 to a containerized instance 102 based on the NATP 26-1 and updates the counter 32 accordingly. The NIAP 90-1 receives a request to assign a network interface to a containerized instance 104 associated with the tenant 22-2. The NIAP 90-1 accesses the NATP 26-2, which corresponds to the tenant 22-2, and which identifies policies that are to be used in the assignment of network interfaces to containerized instances associated with the tenant 22-2. The NIAP 90-1 also accesses the GTS 30-2 to determine whether the assignment of a network interface to the containerized instance 104 would violate any of the policies, such as exceeding a VXLAN connection count, or the number of VLAN IDs associated with the tenant 22-2. In this example, the NIAP 90-1 determines that assignment of a network interface to the containerized instance 104 would not violate any of the policies. The NIAP 90-1 assigns a network interface 106 to the containerized instance 104. The network interface 106 has a VLAN ID attribute 108-1 that indicates the network interface 96 has been assigned the VLAN ID "30" which is different from the VLAN ID assigned to containerized instances associated with the tenant 22-1. The network interface 106 has a VNI attribute 108-2 that is also different from the VNIs assigned to containerized instances associated with the tenant 22-1. The network interface 106 has a physical interface attribute 108-3 that indicates the network interface 106 is assigned to the physical network interface 92-1B ("ETH1") and thus to a different physical network interface than those of the containerized instances 94 and 102 associated with the tenant 22-1.

On the computing device 76-2, the NIAP 90-2 subsequently assigns a network interface 109 to a containerized instance 110 that is associated with the tenant 22-1 based on the NATP 26-1 and updates the counter 32 accordingly. The NIAP 90-2 also subsequently assigns a network interface 112 to a containerized instance 114 that is associated with the tenant 22-1 based on the NATP 26-1 and updates the counter 32 accordingly. Note that the NIAP 90-2 updates the same counter 32 as the NIAP 90-1 executing on the computing device 76-2. Note further that the containerized instances 94, 102, 110 and 114 associated with the tenant 22-1 have all been assigned the same VNI and the same VLAN ID.

The NIAP 90-2 subsequently assigns a network interface 116 to a containerized instance 118 associated with the tenant 22-2 based on the NATP 26-2 and updates the GTS 30-2 accordingly. Note that the NIAP 90-2 updates the same GTS 30-2 as the NIAP 90-1 executing on the computing device 76-2. Note further that the containerized instances 104 and 118 associated with the tenant 22-2 have all been assigned the same VNI and the same VLAN ID.

When the containerized instance 94 is terminated, the NIAP 90-1 is invoked. The NIAP 90-1 performs appropriate removal and/or cleanup of network interface structures or data associated with the network interface 96 and updates the counter 32 to maintain the real-time count of VXLAN network connections utilized by containerized instances associated with the tenant 22-1. The NIAP 90-2 operates similarly when a containerized instance executing on the computing device 76-2 is terminated.

Figure 4A:
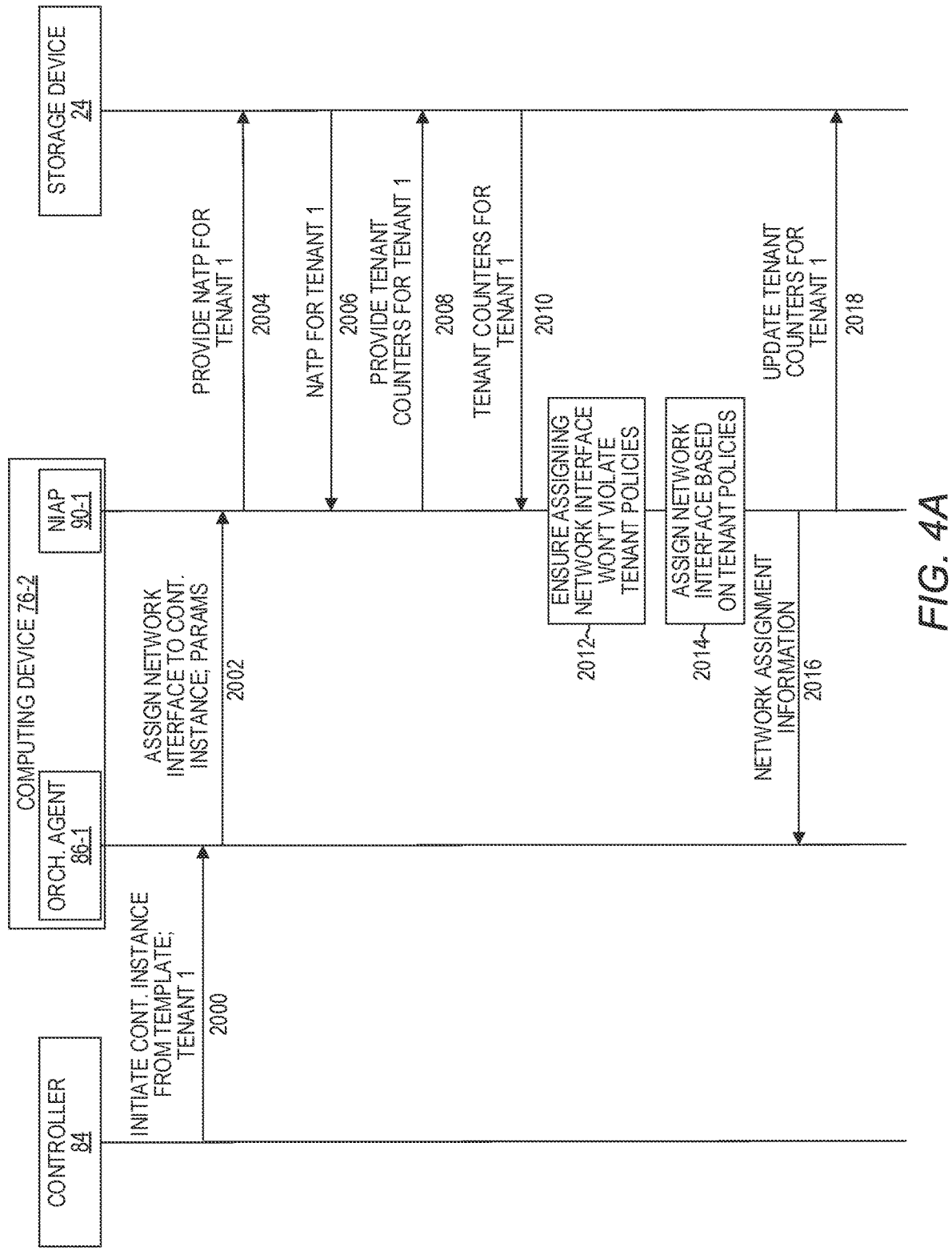
FIGS. 4A-4B are sequence diagrams illustrating a sequence of actions among various components of FIGS. 3A-3C regarding network interface provisioning of containerized instances based on tenant policies according to one example.
Figure 4B:
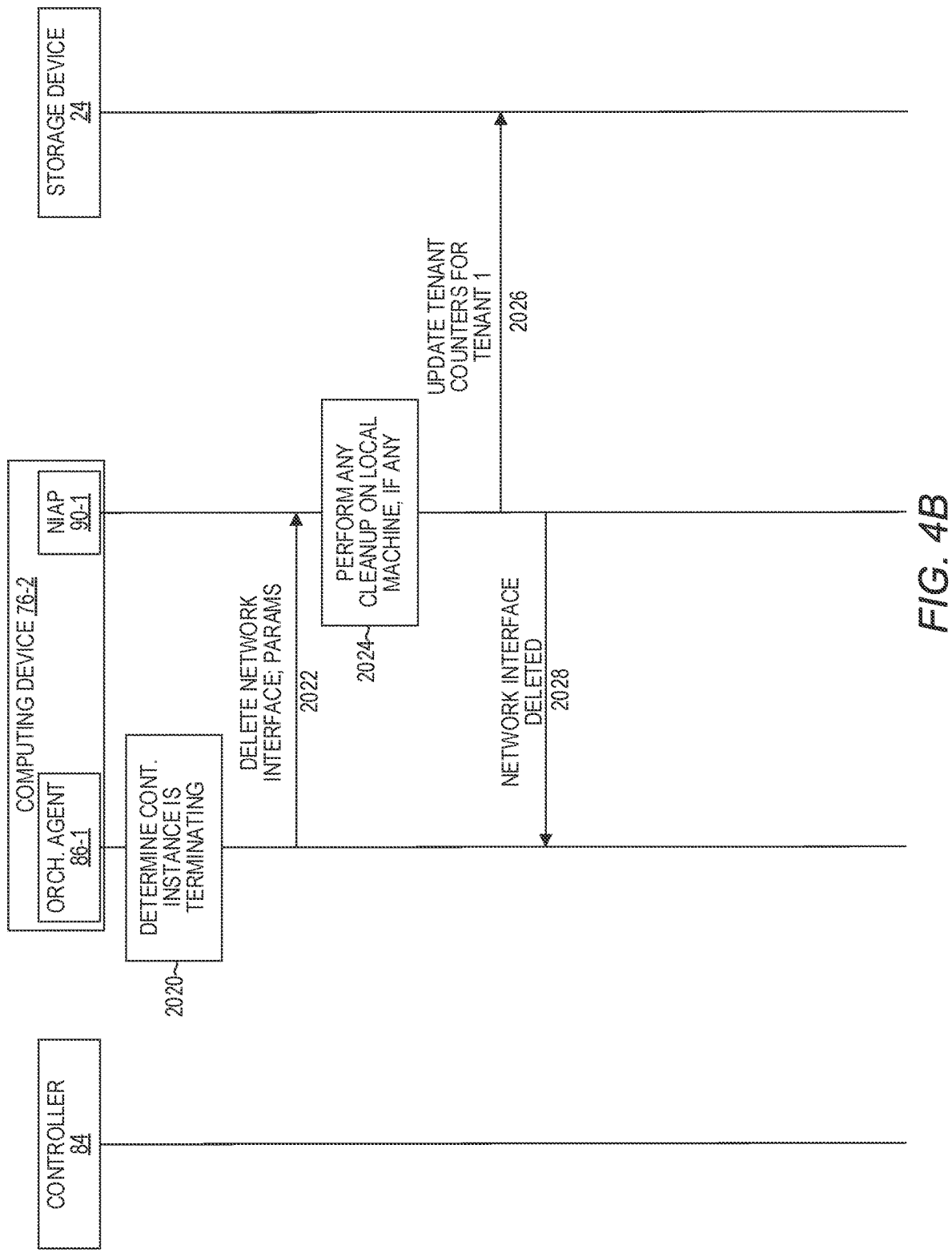

FIGS. 4A-4B are sequence diagrams illustrating a sequence of actions among various components of FIGS. 3A-3C during network interface provisioning of a containerized instance based on tenant policies according to one example. While the example is provided in the context of FIGS. 3A-3C, it is equally applicable to any environment or system utilizing a NIAP, including the environment 10 illustrated in FIGS. 1A-1C.

Referring first to FIG. 4A, this example starts with the controller 84 sending a message to the orchestration agent 86-1 to initiate a containerized instance on the computing device 76-2 (step 2000). The orchestration agent 86-1, in this example, sends a message to the NIAP 90-1 to assign a network interface to the containerized instance. The orchestration agent 86-1 provides the NIAP 90-1 with various parameters. The parameters may include default network parameters associated with the computing device 76-2, a template or manifest that identifies attributes of the containerized instance, and any other desired and/or relevant data (step 2002).

The NIAP 90-1 determines, based on the parameters, that the containerized instance is associated with the tenant 22-1, and requests, from the storage device 24, the NATP 26-1 (step 2004). The storage device 24 provides the NATP 26-1 to the NIAP 90-1 (step 2006). The NIAP 90-1 requests, from the storage device 24, the GTS 30-1 associated with the tenant 22-1 (step 2008). The storage device 24 provides the GTS 30-1 to the NIAP 90-1 (step 2010).

The NIAP 90-1 determines, based on the GTS 30-1, that assigning a network interface to the containerized instance will not violate any policies identified in the NATP 26-1 (step 2012). The NIAP 90-1 assigns a network interface to the containerized instance in accordance with the NATP 26-1 (step 2014). The NIAP 90-1 sends a confirmation and the network assignment information to the orchestration agent 86-1 (step 2014). The NIAP 90-1 updates the GTS 30-1 (step 2018).

Referring now to FIG. 4B, the orchestration agent 86-1 determines that the containerized instance is, or has, terminated (step 2020). The orchestration agent 86-1 sends a message to the NIAP 90-1 requesting that the network interface assigned to the containerized instance be deleted (step 2022). The NIAP 90-1 performs any necessary cleanup on the computing device 76-2 associated with deleting a network connection, and updates the GTS 30-1 to reflect that the network interface has been deleted, such as decrementing any relevant counters by a value of 1 where appropriate (steps 2024, 2026). The NIAP 90-1 sends a confirmation to the orchestration agent 86-1 that the network connection has been deleted (step 2028).

Figure 5:
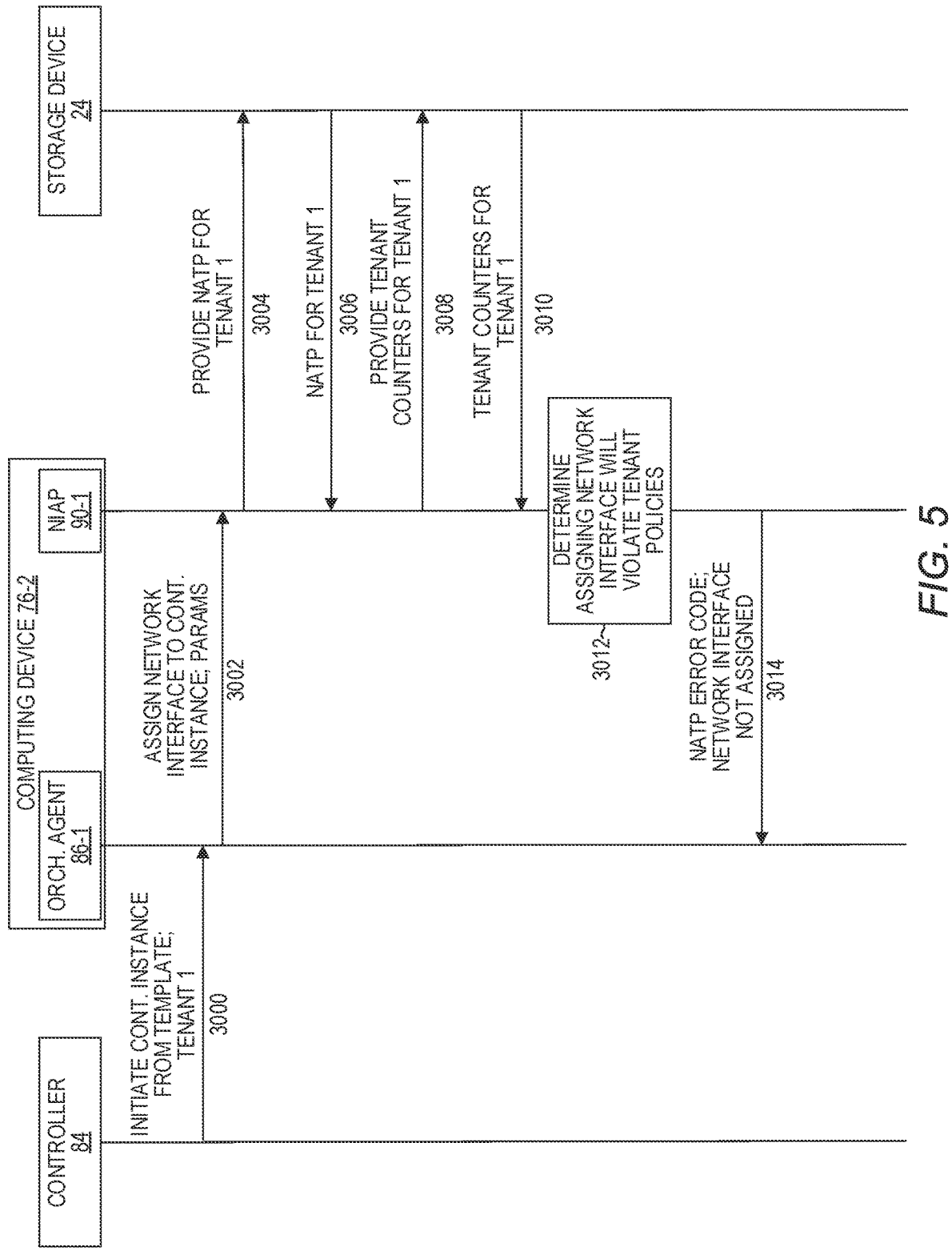
FIG. 5 is a sequence diagram illustrating a sequence of actions among various components of FIGS. 3A-3C during network interface provisioning of a containerized instance based on tenant policies according to another example.

FIG. 5 is a sequence diagram illustrating a sequence of actions among various components of FIGS. 3A-3C during network interface provisioning of a containerized instance based on tenant policies according to another example. While the example is provided in the context of FIGS. 3A-3C, it is equally applicable to any environment or system utilizing a NIAP, including the environment 10 illustrated in FIGS. 1A-1C.

Steps 3000-3010 of FIG. 5 are identical to steps 2000-2010 of FIG. 4A. The NIAP 90-1 in this example, however, determines that assigning the network interface to the containerized instance would violate a policy identified in the NATP 26-1 (step 3012). For example, the limit of VXLAN connections identified in the policy 28-5 may be exceeded. The NIAP 90-1 does not assign the containerized instance a network interface and sends the orchestration agent 86-1 a NATP error code indicating that assigning the containerized instance the network interface would violate the NATP 26-1 (step 3014).

In some implementations, the container orchestration system 78 may offer multiple modes for network interface assignment. A tenant policy mode may be used to assign network interfaces in accordance with tenant policies, and a tenant policy mode override mode may be available where the network interfaces are assigned in accordance with network parameters identified in the containerized instance template, or manifest.

Figure 6:
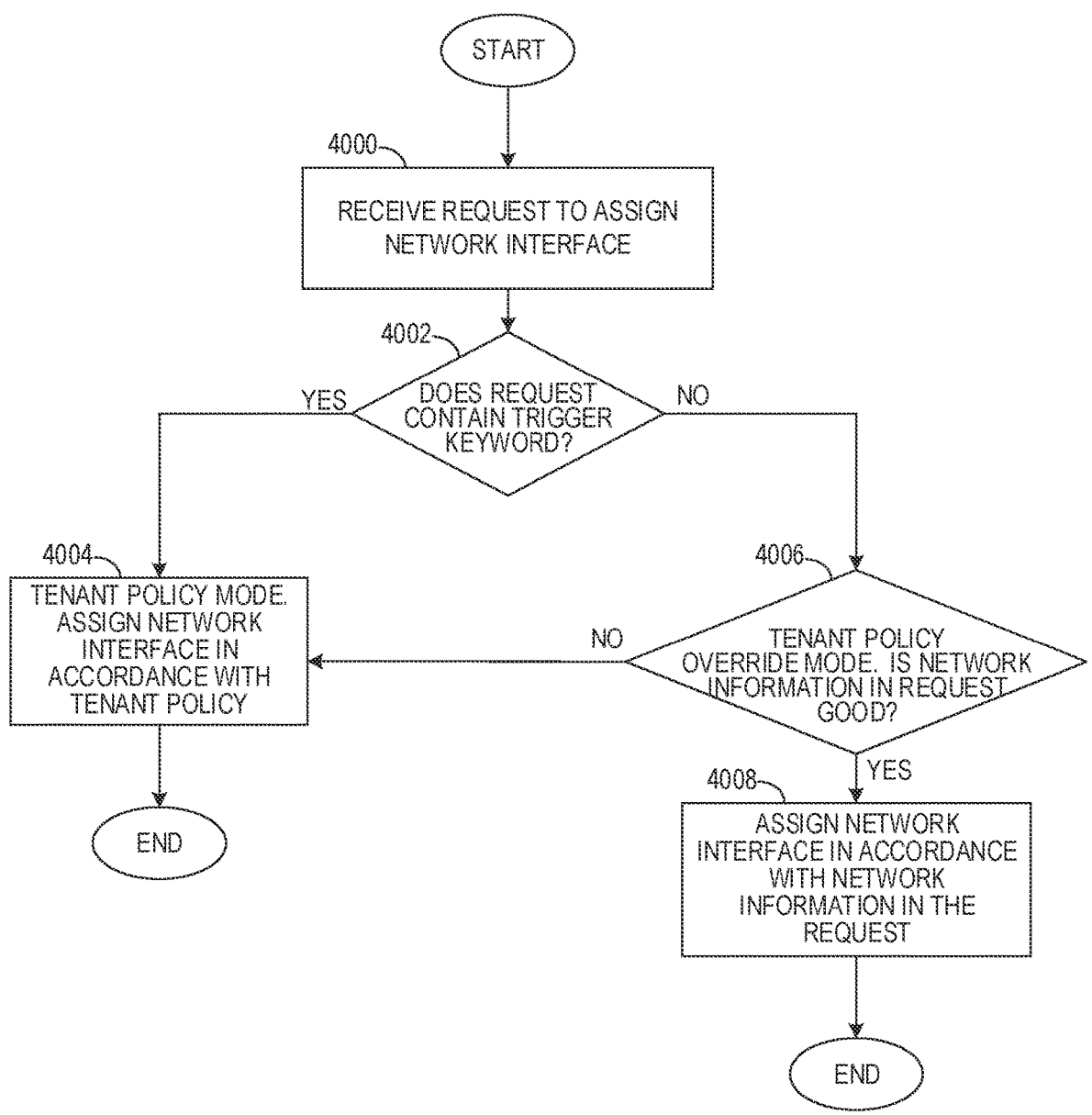
FIG. 6 is a flowchart illustrating a method for implementing multiple modes for network interface assignment according to one implementation.

FIG. 6 is a flowchart illustrating a method for implementing multiple modes for network interface assignment according to one implementation. At step 4000, the NIAP 90-1 receives a request to assign a network interface to a containerized instance. At step 4002, the NIAP 90-1 examines, such as by parsing, the parameters provided to the NIAP 90-1 by the orchestration agent 86-1 to determine whether a trigger keyword exists. If the trigger keyword exists, then the NIAP 90-1 enters tenant policy mode and, at step 4004, assigns a network interface to the containerized instance in accordance with the appropriate tenant policies as discussed above.

If at step 4002 the NIAP 90-1 determines that the trigger keyword does not exist, the NIAP 90-1 enters tenant policy override mode at step 4006. At step 4006, the NIAP 90-1 examines the network parameters identified in the parameters. In some situations, the network parameters may be invalid, such as requesting the use of a bridge that does not exist on the computing device 76-2 or some other parameter that, if followed, would cause the assignment of the network connection to fail. In this case, the NIAP 90-1 may then proceed to step 4004 and enter tenant policy mode and assign a network interface connection in accordance with the appropriate tenant policy. If, at step 4006, the NIAP 90-1 determines that the network interface can be successfully assigned based on the network parameters, the NIAP 90-1 disregards the tenant policies, and assigns a network interface to the containerized instance in accordance with the identified network parameters.

Figure 7:
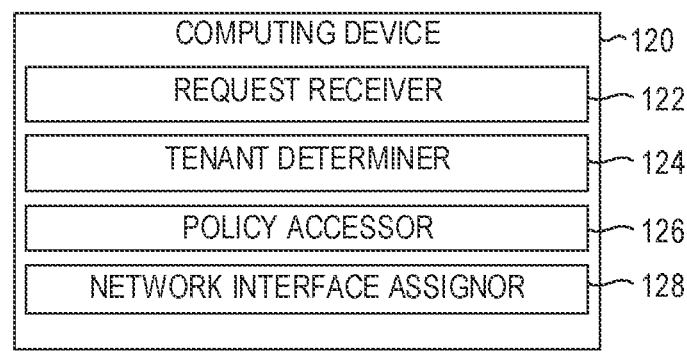
FIG. 7 is a block diagram of a computing device suitable for implementing aspects discussed herein.

FIG. 7 is a block diagram of a computing device 120 suitable for implementing examples discussed herein according to one implementation. The computing device 120 implements identical functionality as that described above with regard to the computing device 12-1. The computing device 120 includes a NIAP that includes a request receiver 122 that is configured to receive a request to assign a network interface to a containerized instance comprising at least one container. The request receiver 122 may comprise executable software instructions configured to program a processor device to implement the functionality of receiving a request to assign a network interface to a containerized instance comprising at least one container, may comprise circuitry including, by way of non-limiting example, an application-specific integrated circuit (ASIC), field-programmable gate array (FPGA), or may comprise a combination of executable software instructions and circuitry. The request receiver 122 may receive a request from a task executing on the computing device 120, such as a task in a VM, a container orchestration agent, a container runtime, or the like. The request may include parameters passed into the NIAP via an input stream, via runtime variables, via a known location of a file or structure that has the appropriate information that the NIAP can access upon receiving the request, or via any other suitable manner.

The computing device 120 includes a tenant determiner 124 of the NIAP that is configured to determine that a first tenant of a plurality of different tenants is associated with the containerized instance. The tenant determiner 124 may comprise executable software instructions configured to program a processor device to implement the functionality of determining that a first tenant of a plurality of different tenants is associated with the containerized instance, may comprise circuitry including, by way of non-limiting example, an application-specific integrated circuit (ASIC), field-programmable gate array (FPGA), or may comprise a combination of executable software instructions and circuitry. The tenant determiner 124 may make the determination based on information passed into the request receiver 122, by querying attributes of the computing device 120, or by any other suitable means.

The computing device 120 includes a policy accessor 126 of the NIAP that is configured to access a NATP that corresponds to the first tenant. The policy accessor 126 may comprise executable software instructions configured to program a processor device to implement the functionality of accessing a NATP that corresponds to the first tenant, may comprise circuitry including, by way of non-limiting example, an application-specific integrated circuit (ASIC), field-programmable gate array (FPGA), or may comprise a combination of executable software instructions and circuitry. In some implementations the policy accessor 126 may access a storage device that stores a plurality of NATPs and select the NATP from the plurality of NATPs. In some implementations the policy accessor 126 may send a request, along with a tenant identifier that identifies the first tenant, to a NATP server that returns the NATP to the policy accessor 126.

The computing device 120 includes a network interface assignor 128 of the NIAP that is configured to, based on the NATP, assign, to the containerized instance, a network interface via which the containerized instance can communicate with other containerized instances associated with the first tenant. The network interface assignor 128 may comprise executable software instructions configured to program a processor device to implement the functionality of, based on the NATP, assigning, to the first containerized instance, a first network interface via which the first containerized instance can communicate with other containerized instances associated with the first tenant, may comprise circuitry including, by way of non-limiting example, an application-specific integrated circuit (ASIC), field-programmable gate array (FPGA), or may comprise a combination of executable software instructions and circuitry. In some implementations, the network interface assignor 128 utilizes a Linux bridge or other virtualized network interface to assign a network interface having the appropriate network attributes, such as VNI and/or VLAN ID, that is associated with a desired physical network interface.

Figure 8:
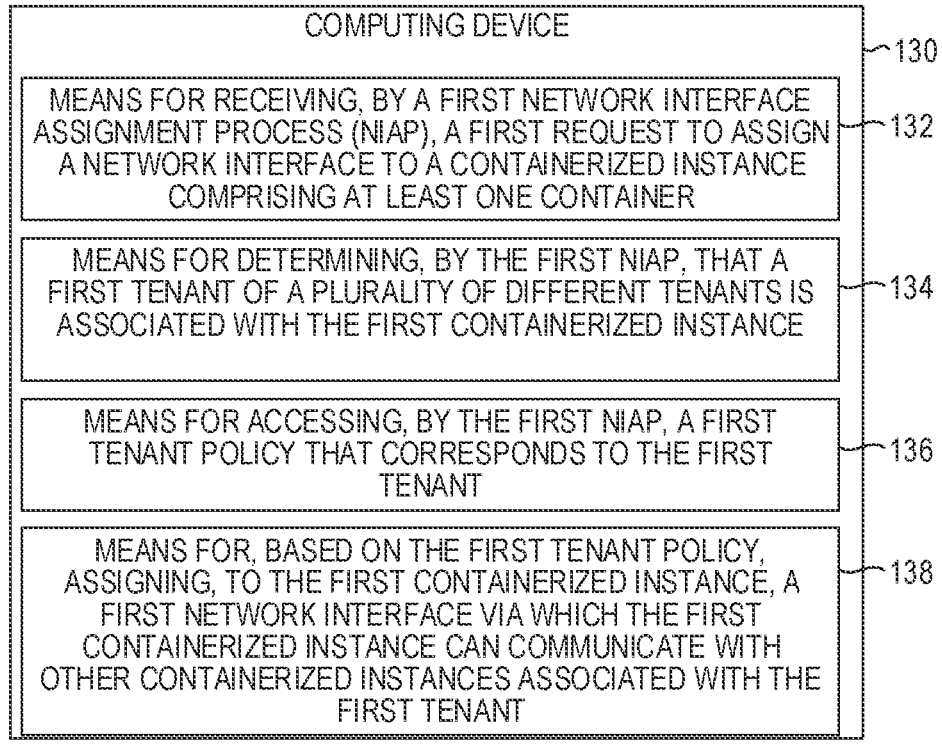
FIG. 8 is a block diagram of a computing device suitable for implementing aspects discussed herein according to another implementation.

FIG. 8 is a block diagram of a computing device 130 suitable for implementing examples discussed herein according to another implementation. The computing device 130 implements identical functionality as that described above with regard to the computing device 120. In this implementation, the computing device 130 includes a means 132 for receiving, by a NIAP, a request to assign a network interface to a containerized instance comprising at least one container. The means 132 may be implemented in any number of manners, including, for example, via the request receiver 122 illustrated in FIG. 7.

The computing device 130 includes a means 134 for determining, by the NIAP, that a first tenant of a plurality of different tenants is associated with the containerized instance. The means 134 may be implemented in any number of manners, including, for example, via the tenant determiner 124 illustrated in FIG. 7.

The computing device 130 includes a means 136 for accessing, by the NIAP, a NATP that corresponds to the first tenant. The means 136 may be implemented in any number of manners, including, for example, via the policy accessor 126 illustrated in FIG. 7.

The computing device 130 includes a means 138 for, based on the first NATP, assigning, to the containerized instance, a network interface via which the containerized instance can communicate with other containerized instances associated with the first tenant. The means 138 may be implemented in any number of manners, including, for example, via the network interface assignor 128 in FIG. 7.

Figure 9:
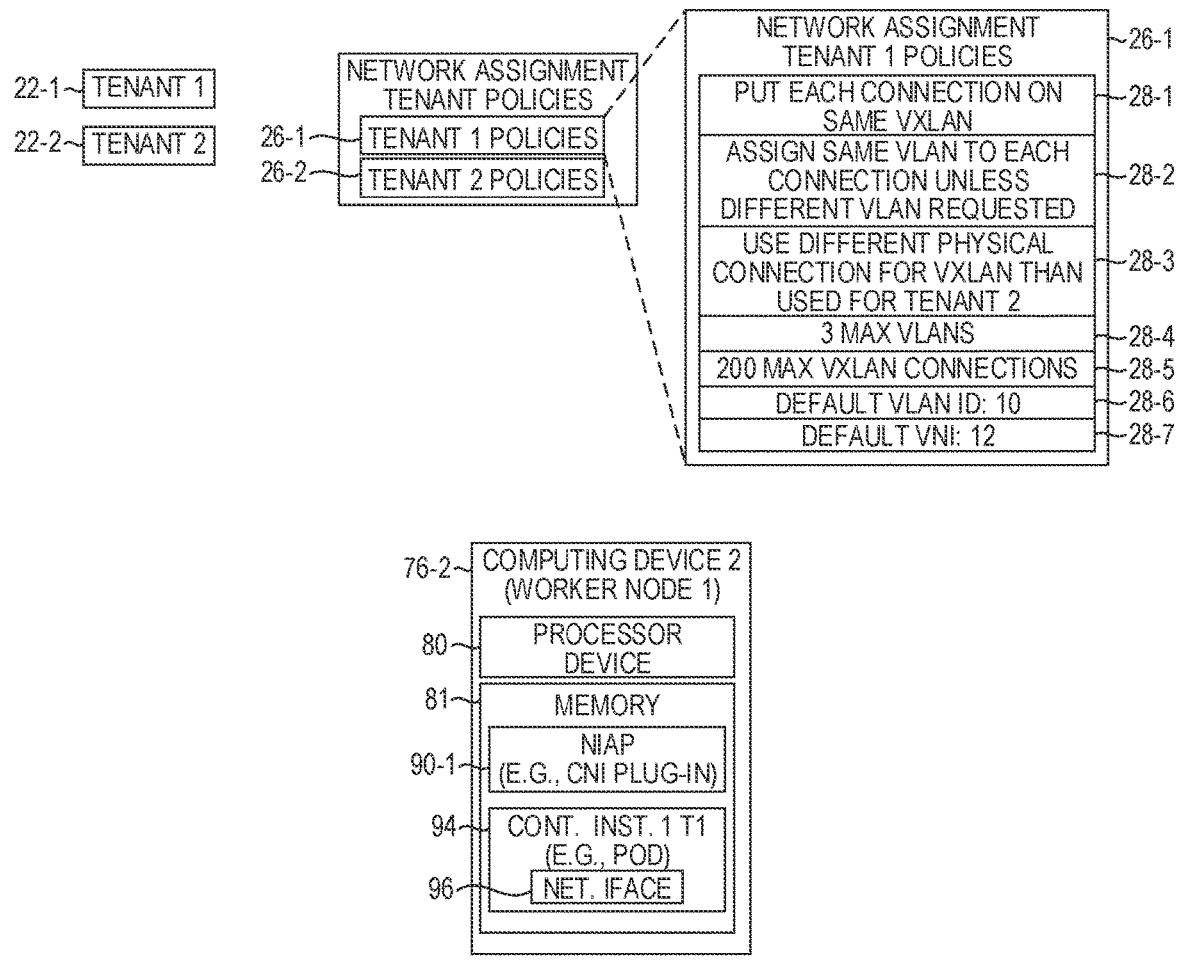
FIG. 9 is a simplified block diagram of the environment illustrated in FIGS. 3A-3C according to one implementation.

FIG. 9 is a simplified block diagram of the environment 10-1 illustrated in FIGS. 3A-3C according to one implementation. The environment 10-1 includes the computing device 76-2, which includes the memory 81, and the processor device 80 coupled to the memory 81 to receive, by the NIAP 90-1, a request to assign a network interface to the containerized instance 94 that includes at least one container. The processor device 80 is further to determine, by the NIAP 90-1, that the tenant 22-1 of the plurality of different tenants 22-1-22-2 is associated with the containerized instance 94. The processor device 80 is further to access, by the NIAP 90-1, the NATP 26-1 that corresponds to the tenant 22-1. The processor device 80 is further to, based on the NATP 26-1, assign, to the containerized instance 94, the network interface 96 via which the containerized instance 94 can communicate with other containerized instances associated with the tenant 22-1.

Figure 10:
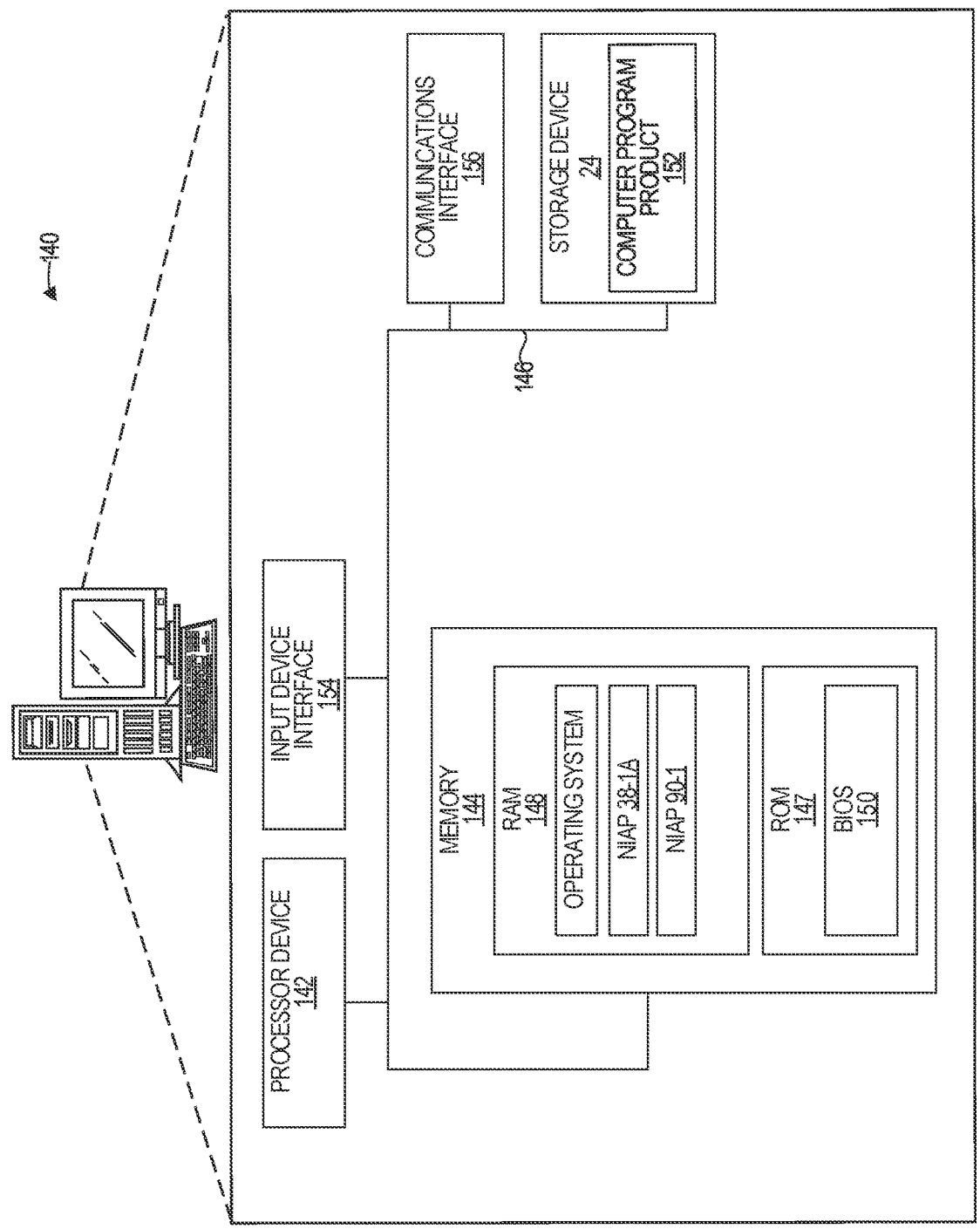
FIG. 10 is a block diagram of a computing device suitable for implementing aspects disclosed herein.

FIG. 10 is a block diagram of a computing device 140 suitable for implementing any of the computing devices disclosed herein, including, for example, the computing devices 12-1, 12-2, 76-2 and 76-3. The computing device 140 may comprise any computing or electronic device capable of including firmware, hardware, and/or executing software instructions to implement the functionality described herein, such as a computer server, a desktop computing device, a laptop computing device, or the like. The computing device 140 includes a processor device 142, a system memory 144, and a system bus 146. The system bus 146 provides an interface for system components including, but not limited to, the system memory 144 and the processor device 142. The processor device 142 can be any commercially available or proprietary processor.

The system bus 146 may be any of several types of bus structures that may further interconnect to a memory bus (with or without a memory controller), a peripheral bus, and/or a local bus using any of a variety of commercially available bus architectures. The system memory 144 may include non-volatile memory 147 (e.g., read-only memory (ROM), erasable programmable read-only memory (EPROM), electrically erasable programmable read-only memory (EEPROM), etc.), and volatile memory 148 (e.g., random-access memory (RAM)). A basic input/output system (BIOS) 150 may be stored in the non-volatile memory 147 and can include the basic routines that help to transfer information between elements within the computing device 140. The volatile memory 148 may also include a high-speed RAM, such as static RAM, for caching data.

The computing device 140 may further include or be communicatively coupled to a non-transitory computer-readable storage medium such as the storage device 24, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 24 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 24 and in the volatile memory 148, including an operating system and one or more program modules, such as the NIAPs 38-1A and 90-1, which may implement the functionality described herein in whole or in part.

All or a portion of the examples may be implemented as a computer program product 152 stored on a transitory or non-transitory computer-usable or computer-readable storage medium, such as the storage device 24, which includes complex programming instructions, such as complex computer-readable program code, to cause the processor device 142 to carry out the steps described herein. Thus, the computer-readable program code can comprise software instructions for implementing the functionality of the examples described herein when executed on the processor device 142.

An operator may also be able to enter one or more configuration commands through a keyboard (not illustrated), a pointing device such as a mouse (not illustrated), or a touch-sensitive surface such as a display device. Such input devices may be connected to the processor device 142 through an input device interface 154 that is coupled to the system bus 146 but can be connected by other interfaces such as a parallel port, an Institute of Electrical and Electronic Engineers (IEEE) 1394 serial port, a Universal Serial Bus (USB) port, an IR interface, and the like. The computing device 140 may also include one or more physical communications interfaces 156, such as the physical network interfaces 18-1A, 18-1B, 92-1A, 92-1B, or the like.

Other computer system designs and configurations may also be suitable to implement the systems and methods described herein. The following examples illustrate various additional implementations in accordance with one or more aspects of the disclosure.

Example 1 is a computing device that includes means for receiving, by a first network interface assignment process (NIAP), a first request to assign a network interface to a first containerized instance comprising at least one container; means for determining, by the first NIAP, that a first tenant of a plurality of different tenants is associated with the first containerized instance; means for accessing, by the first NIAP, a first network assignment tenant policy (NATP) that corresponds to the first tenant; and means for, based on the first NATP, assigning, to the first containerized instance, a first network interface via which the first containerized instance can communicate with other containerized instances associated with the first tenant.

Example 2 is the computing device of example 1 wherein the first NIAP includes a container network interface (CNI) plug-in and the CNI plug-in executes on a worker node in a multiple worker node container orchestration system.

Example 3 is the computing device of example 2 wherein the container orchestration system comprises a Kubernetes container orchestration system.

Example 4 is the computing device of example 3 wherein the CNI plug-in is one of a plurality of different CNI plug-ins, and further including means for determining by a kubelet process of the Kubernetes container orchestration system, that the CNI plug-in of the plurality of different CNI plug-ins is to be invoked to assign a network interface to the first containerized instance; and means for sending the first request to the CNI plug-in to assign, to the containerized instance, the network interface.

Example 5 is the computing device of example 1 wherein the first request includes network interface information that identifies a network element that does not exist on a first computing device; and means for determining, by the first NIAP that the network element does not exist on the first computing device, wherein the first NIAP accesses the first NATP in response to determining that the network element does not exist on the first computing device.

Example 6 is the computing device of example 1 wherein the first NIAP is invoked for a container executing in a virtual machine that is executing a container runtime engine.

Example 7 is a computing device that includes a request receiver to receive, by a first network interface assignment process (NIAP) executing on a first processor device on a first computing device, a first request to assign a first network interface to a first containerized instance comprising at least one container; a tenant determiner to determine, by the first NIAP, that a first tenant of a plurality of different tenants is associated with the first containerized instance; a policy accessor to access, by the first NIAP, a first network assignment tenant policy (NATP) that corresponds to the first tenant; and a network interface assignor to, based on the first NATP, assign, to the first containerized instance, a first network interface via which the first containerized instance can communicate with other containerized instances associated with the first tenant.

Example 8 is a method that includes receiving, by a first network interface assignment process (NIAP) executing on a first processor device on a first computing device, a first request to assign a first network interface to a first containerized instance comprising at least one container; determining, by the first NIAP, that a first tenant of a plurality of different tenants is associated with the first containerized instance; accessing, by the first network assignment process, a first network assignment tenant policy (NATP) that corresponds to the first tenant; based on the first NATP, determining that assigning, to the containerized instance, the first network interface would violate the first NATP; and rejecting the first request to assign the first network interface to the first containerized instance.

Example 9 is the method of example 8 wherein determining that assigning, to the containerized instance, the first network interface would violate the first NATP includes determining that a Virtual Extensible Local Area Network (VXLAN) network interface having a VXLAN network identifier (VNI) is to be assigned to the first containerized instance, accessing a VNI counter in a global tenant structure, and determining, based on the VNI counter that no more VXLAN network interfaces having the VNI are to be assigned to containerized instances.

Example 10 is the method of example 8 wherein determining that assigning, to the containerized instance, the first network interface would violate the first NATP includes determining that a Virtual Local Area Network (VLAN) network interface having a VLAN identifier is to be assigned to the containerized instance, accessing a Local Area Network (LAN) counter in a global tenant structure, and determining, based on the VLAN counter that no more VLAN network interfaces having the VLAN identifier are to be assigned to containerized instances.

Example 11 is the method of example 8 wherein rejecting the first request includes responding to the first request with a NATP error code indicating that assigning, to the containerized instance, the network interface would violate the first NATP.

Example 12 is a computing device comprising a memory and a processor device coupled to the memory, wherein the processor device is to receive, by a first network interface assignment process (NIAP) executing on a first processor device on a first computing device, a first request to assign a first network interface to a first containerized instance comprising at least one container; determine, by the first NIAP, that a first tenant of a plurality of different tenants is associated with the first containerized instance; access, by the first network assignment process, a first network assignment tenant policy (NATP) that corresponds to the first tenant; based on the first NATP, determine that assigning, to the first containerized instance, the first network interface would violate the first NATP; and reject the request to assign the first network interface to the first containerized instance.

Example 12 is a method that includes receiving, by a first network interface assignment process (NIAP) executing on a first processor device on a first computing device, a first request to assign a first network interface to a first containerized instance comprising at least one container, the first request including a Virtual Local Area Network (VLAN) keyword and a VLAN identifier; determining, by the first NIAP, that a first tenant of a plurality of different tenants is associated with the first containerized instance; accessing, by the first NIAP, a first network assignment tenant policy (NATP) that corresponds to the first tenant; and based on the first NATP, assigning, to the first containerized instance, a first network interface via which the first containerized instance can communicate with other containerized instances associated with the first tenant, the first network interface comprising a VLAN network interface having the VLAN identifier.

Example 13 is the method of example 12 that further includes receiving, by the first NIAP, a second request to assign a second network interface to a second containerized instance comprising at least one container, the second request omitting the VLAN keyword; determining, by the first NIAP, that the first tenant of the plurality of different tenants is associated with the second containerized instance; accessing, by the first NIAP, the first NATP that corresponds to the first tenant; determining, based on the first NATP, a default VLAN identifier; and based on the first NATP, assigning, to the second containerized instance, a second network interface via which the second containerized instance can communicate with other containerized instances associated with the first tenant, the second network interface comprising a VLAN network interface having the default VLAN identifier.

Example 14 is the method of example 12 wherein the first tenant comprises one of a namespace, a managed cluster, or a service account.

Example 15 is a computing device comprising a memory and a processor device coupled to the memory, wherein the processor device is to receive, by a first network interface assignment process (NIAP) executing on a first processor device on a first computing device, a first request to assign a first network interface to a first containerized instance comprising at least one container, the first request including a Virtual Local Area Network (VLAN) keyword and a VLAN identifier; determine, by the first NIAP, that a first tenant of a plurality of different tenants is associated with the first containerized instance; access, by the first NIAP, a first network assignment tenant policy (NATP) that corresponds to the first tenant; and based on the first NATP, assign, to the first containerized instance, a first network interface via which the first containerized instance can communicate with other containerized instances associated with the first tenant, the first network interface comprising a VLAN network interface having the VLAN identifier.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a first network interface assignment process (NIAP) executing on a first processor device on a first computing device, a first request to assign a network interface to a first containerized instance comprising at least one container;
   determining, by the first NIAP, that a first tenant of a plurality of different tenants is associated with the first containerized instance, wherein the first containerized instance is isolated from resources of containerized instances associated with other tenants of the plurality of different tenants;
   accessing, by the first NIAP, a first network assignment tenant policy (NATP) that corresponds to the first tenant; and
   based on the first NATP, assigning, to the first containerized instance, a first network interface via which the first containerized instance can communicate with other containerized instances associated with the first tenant.

2. The method of claim 1 further comprising updating, by the first NIAP, a first global tenant structure that maintains real-time information regarding network interfaces assigned to containerized instances associated with the first tenant to reflect the assigning of the first network interface to the first containerized instance.

3. The method of claim 2 further comprising:
   receiving, by the first NIAP, a request to delete the first network interface;
   determining, by the first NIAP, that the first tenant is associated with the first containerized instance; and
   updating the first global tenant structure to reflect the deleting of the first network interface.

4. The method of claim 1 wherein assigning, to the first containerized instance, the first network interface comprises:
   determining a Virtual Extensible Local Area Network (VXLAN) network identifier (VNI) associated with the first tenant; and
   assigning, to the first containerized instance, a VXLAN network interface having the VNI.

5. The method of claim 4 further comprising updating, by the first NIAP, a first global tenant structure that maintains real-time information regarding network interfaces assigned to containerized instances associated with the first tenant to reflect the assigning of the first network interface to the first containerized instance by incrementing a VXLAN interface counter in the first global tenant structure by a value of one.

6. The method of claim 4 wherein assigning, to the first containerized instance, the first network interface further comprises:
   determining a Virtual Local Area Network (VLAN) identifier (ID) associated with the first tenant; and
   assigning, to the first containerized instance, a VLAN interface having the VLAN ID.

7. The method of claim 1 wherein assigning, to the first containerized instance, the first network interface further comprises:
   determining a VLAN ID associated with the first tenant; and
   assigning, to the first containerized instance, a VLAN interface having the VLAN ID.

8. The method of claim 1 wherein the first containerized instance comprises a Kubernetes pod.

9. The method of claim 8 wherein the first containerized instance comprises a container.

10. The method of claim 1 wherein the first NIAP comprises a container network interface (CNI) plug-in and the CNI plug-in executes on a worker node in a multiple worker node container orchestration system.

11. The method of claim 1 further comprising:
   receiving, by the first NIAP, a request to assign a second network interface to a second containerized instance comprising at least one container;
   determining, by the first NIAP, that a second tenant of the plurality of different tenants is associated with the second containerized instance;
   accessing, by the first NIAP, a second NATP that corresponds to the second tenant; and
   based on the second NATP, assigning, to the second containerized instance, a second network interface via which the second containerized instance can communicate with other containerized instances associated with the second tenant.

12. The method of claim 11 further comprising:
   updating, by the first NIAP, a first global tenant structure that maintains real-time information regarding network interfaces assigned to containerized instances associated with the first tenant to reflect the assigning of the first network interface to the first containerized instance; and
   updating, by the first NIAP, a second global tenant structure that maintains real-time information regarding network interfaces assigned to containerized instances associated with the second tenant to reflect the assigning of the second network interface to the second containerized instance.

13. The method of claim 1 further comprising:
   receiving, by a second NIAP executing on a second processor device on a second computing device, a second request to assign a network interface to a second containerized instance comprising at least one container;
   determining, by the second NIAP, that the first tenant is associated with the second containerized instance;
   accessing, by the second NIAP, the first NATP;
   based on the first NATP, assigning, to the second containerized instance, a second network interface via which the second containerized instance can communicate with the first containerized instance; and
   updating, by the second NIAP, a first global tenant structure to reflect the assigning of the second network interface to the second containerized instance.

14. The method of claim 13 further comprising:
   determining, by the first NIAP, a VNI associated with the first tenant;
   assigning, to the first containerized instance, a VXLAN network interface having the VNI;
   determining, by the second NIAP, the VNI; and
   assigning, to the second containerized instance, a VXLAN network interface having the VNI.

15. The method of claim 1 wherein the first request includes a trigger keyword, and further comprising:
   determining, by the first NIAP, that the first request includes the trigger keyword, wherein the first NIAP accesses the first NATP in response to determining that the first request includes the trigger keyword.

16. The method of claim 15 further comprising:
   receiving, by the first NIAP, a second request to assign a second network interface to a second containerized instance comprising at least one container;
   determining that the second request lacks the trigger keyword; and
   in response to determining that the second request lacks the trigger keyword, utilizing a non-NATP mode whereby the second containerized instance is assigned the second network interface based on information contained in the second request and not based on an NATP.

17. A computing device, comprising:
   a memory; and
   a processor device coupled to the memory to:
      receive, by a first network interface assignment process (NIAP), a first request to assign a network interface to a first containerized instance comprising at least one container;
      determine, by the first NIAP, that a first tenant of a plurality of different tenants is associated with the first containerized instance, wherein the first containerized instance is isolated from resources of containerized instances associated with other tenants of the plurality of different tenants;
      access, by the first NIAP, a first network assignment tenant policy (NATP) that corresponds to the first tenant; and
      based on the first NATP, assign, to the first containerized instance, a first network interface via which the first containerized instance can communicate with other containerized instances associated with the first tenant.

18. The computing device of claim 17 wherein the processor device is further to:
   update, by the first NIAP, a first global tenant structure that maintains real-time information regarding network interfaces assigned to containerized instances associated with the first tenant to reflect the assigning of the first network interface to the first containerized instance;
   subsequently receive, by the first NIAP, a request to delete the first network interface;
   determine, by the first NIAP, that the first tenant is associated with the first containerized instance; and
   update the first global tenant structure to reflect the deleting of the first network interface.

19. A non-transitory computer-readable storage medium that includes executable instructions to cause a processor device to:
   receive, by a first network interface assignment process (NIAP), a first request to assign a network interface to a first containerized instance comprising at least one container;
   determine, by the first NIAP, that a first tenant of a plurality of different tenants is associated with the first containerized instance, wherein the first containerized instance is isolated from resources of containerized instances associated with other tenants of the plurality of different tenants;
   access, by the first NIAP, a first network assignment tenant policy (NATP) that corresponds to the first tenant; and
   based on the first NATP, assign, to the first containerized instance, a first network interface via which the first containerized instance can communicate with other containerized instances associated with the first tenant.

20. The non-transitory computer-readable storage medium of claim 19 wherein to assign, to the first containerized instance, the first network interface, the instructions further cause the processor device to:
   determine a Virtual Extensible Local Area Network (VXLAN) network identifier (VNI) associated with the first tenant; and
   assign, to the first containerized instance, a VXLAN network interface having the VNI; and
   wherein the instructions further cause the processor device to update, by the first NIAP, a first global tenant structure that maintains real-time information regarding network interfaces assigned to containerized instances associated with the first tenant to reflect the assigning of the first network interface to the first containerized instance by incrementing a VXLAN interface counter in the first global tenant structure by a value of one.

* * * * *